(12) United States Patent  (10) Patent No.: US 8,067,911 B2
Mullin  (45) Date of Patent: Nov. 29, 2011

(54) INTERFACE CORD AND SYSTEM INCLUDING AN INTERFACE CORD

(75) Inventor: Paul Steven Mullin, Yellow Springs, OH (US)

(73) Assignee: Regal Beloit EPC Inc., Beloit, WI (US)

( * ) Notice: Subject to any disclaimer, the term of this patent is extended or adjusted under 35 U.S.C. 154(b) by 230 days.

(21) Appl. No.: 12/358,692

(22) Filed: Jan. 23, 2009

(65) Prior Publication Data

US 2009/0128068 A1 May 21, 2009

Related U.S. Application Data

(63) Continuation of application No. 12/374,840, filed as application No. PCT/US2007/074977 on Aug. 1, 2007.

(60) Provisional application No. 60/834,698, filed on Aug. 1, 2006.

(51) Int. Cl.
*H02P 6/00* (2006.01)
*H02P 31/00* (2006.01)
*H02P 1/04* (2006.01)
*G05B 19/02* (2006.01)

(52) U.S. Cl. .............. 318/400.01; 318/400.26; 318/480; 318/701; 235/492; 711/115; 710/10; 710/72

(58) Field of Classification Search .............. 318/400.1, 318/400.26, 254, 432, 480, 567, 471; 700/276; 701/29; 710/15, 72; 235/492, 441
See application file for complete search history.

(56) References Cited

U.S. PATENT DOCUMENTS

| | | |
|---|---|---|
| 4,417,196 A | 11/1983 | Cueto et al. |
| 5,245,258 A | 9/1993 | Becker et al. |
| 5,467,921 A | 11/1995 | Shreeve et al. |
| 5,473,229 A | 12/1995 | Archer et al. |
| 5,538,486 A | 7/1996 | France et al. |
| 5,729,204 A | 3/1998 | Fackler et al. |
| 5,801,940 A | 9/1998 | Russ et al. |
| 5,920,734 A | 7/1999 | Holmdahl |
| 6,099,324 A | 8/2000 | Janssen et al. |
| 6,199,018 B1 | 3/2001 | Quist et al. |
| 6,218,798 B1 | 4/2001 | Price et al. |
| 6,289,735 B1 | 9/2001 | Dister et al. |
| 6,295,510 B1 | 9/2001 | Discenzo |
| 6,356,044 B1 | 3/2002 | Archer |
| 6,434,512 B1 | 8/2002 | Discenzo |
| 6,456,023 B1 * | 9/2002 | Becerra et al. ........... 318/400.26 |
| 6,497,035 B1 | 12/2002 | Ratliff |
| 6,504,379 B1 | 1/2003 | Jackson |
| 6,665,163 B2 | 12/2003 | Yanagisawa |
| 6,753,629 B2 | 6/2004 | Doi et al. |

(Continued)

OTHER PUBLICATIONS

International Search Report and Written Opinion for Application No. PCT/US07/74977 dated Sep. 26, 2008 (5 pages).

(Continued)

*Primary Examiner* — Paul Ip
(74) *Attorney, Agent, or Firm* — Michael Best & Friedrich LLP

(57) ABSTRACT

An interface module is operable to download data from an electrical machine. The interface module includes a cable for transferring data, the cable having a first connector at a first end thereof, a circuit board having a programmable device electrically coupled in circuit to the cable, and a memory connected to the circuit board and configured to store data related to the operating characteristics of the electrical machine.

9 Claims, 16 Drawing Sheets

U.S. PATENT DOCUMENTS

| | | | |
|---|---|---|---|
| 6,765,361 B1 | 7/2004 | Beifus et al. | |
| 6,768,279 B1 | 7/2004 | Skinner et al. | |
| 6,826,454 B2 * | 11/2004 | Sulfstede | 700/276 |
| 7,106,019 B2 * | 9/2006 | Becerra et al. | 318/400.01 |
| 7,108,191 B2 | 9/2006 | Andrus | |
| 7,143,202 B2 | 11/2006 | Tehrani et al. | |
| 7,367,513 B2 | 5/2008 | Andrus | |
| 7,571,034 B2 * | 8/2009 | Raichle et al. | 701/29 |
| 7,685,363 B2 | 3/2010 | Lin et al. | |
| 7,831,338 B1 * | 11/2010 | Haydu | 700/276 |
| 2002/0049505 A1 | 4/2002 | Heinemann et al. | |
| 2002/0117986 A1 * | 8/2002 | Becerra et al. | 318/480 |
| 2003/0005188 A1 | 1/2003 | Tehrani et al. | |
| 2004/0148451 A1 | 7/2004 | Lai et al. | |
| 2004/0181935 A1 | 9/2004 | Rohrbach et al. | |
| 2004/0230708 A1 * | 11/2004 | Juan | 710/1 |
| 2005/0261026 A1 | 11/2005 | Hausman et al. | |
| 2006/0081716 A1 | 4/2006 | Andrus | |
| 2007/0023529 A1 | 2/2007 | Andrus | |
| 2007/0085498 A1 * | 4/2007 | Kulkarni et al. | 318/254 |
| 2007/0119049 A1 * | 5/2007 | Teranaka | 29/740 |
| 2007/0143543 A1 | 6/2007 | Lin et al. | |
| 2007/0152613 A1 * | 7/2007 | Mullin | 318/432 |
| 2007/0274694 A1 | 11/2007 | Wu et al. | |
| 2008/0106306 A1 | 5/2008 | Keady et al. | |
| 2008/0140171 A1 | 6/2008 | Roberts et al. | |
| 2008/0197797 A1 * | 8/2008 | El-Ibiary | 318/567 |
| 2008/0218112 A1 | 9/2008 | Beifus et al. | |
| 2008/0222313 A1 | 9/2008 | Andrus et al. | |
| 2008/0265940 A1 | 10/2008 | Inose | |
| 2009/0128067 A1 | 5/2009 | Mullin | |
| 2009/0209128 A1 | 8/2009 | Mullin | |
| 2010/0045864 A1 | 2/2010 | Stewart et al. | |
| 2010/0246075 A1 | 9/2010 | Chao | |

OTHER PUBLICATIONS

United States Patent Office Action for U.S. Appl. No. 12/358,657 dated Nov. 22, 2010 (9 pages).

United States Patent Office Action for U.S. Appl. No. 12/374,840 dated Feb. 28, 2011 (14 pages).

United States Patent Office Notice of Allowance for U.S. Appl. No. 12/358,657 dated Mar. 7, 2011 (8 pages).

United States Patent Office Notice of Allowance for U.S. Appl. No. 12/374,840 dated Jul. 19, 2011 (7 pages).

United States Patent Office Notice of Allowance for U.S. Appl. No. 12/358,657 dated Jul. 19, 2011 (5 pages).

Chinese Patent Office Action for Application No. 200780031937.3 dated May 23, 2011 (6 pages).

* cited by examiner

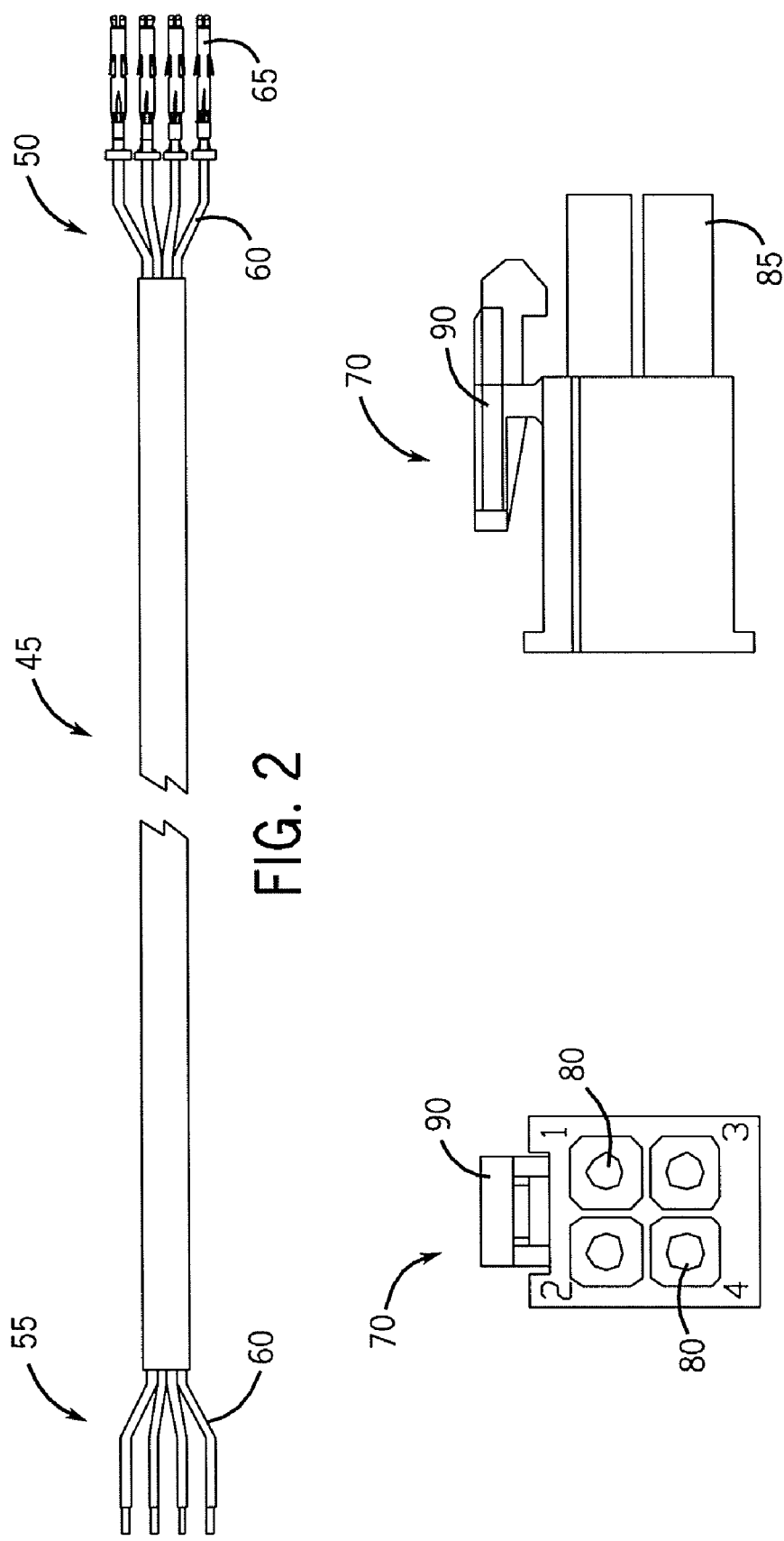

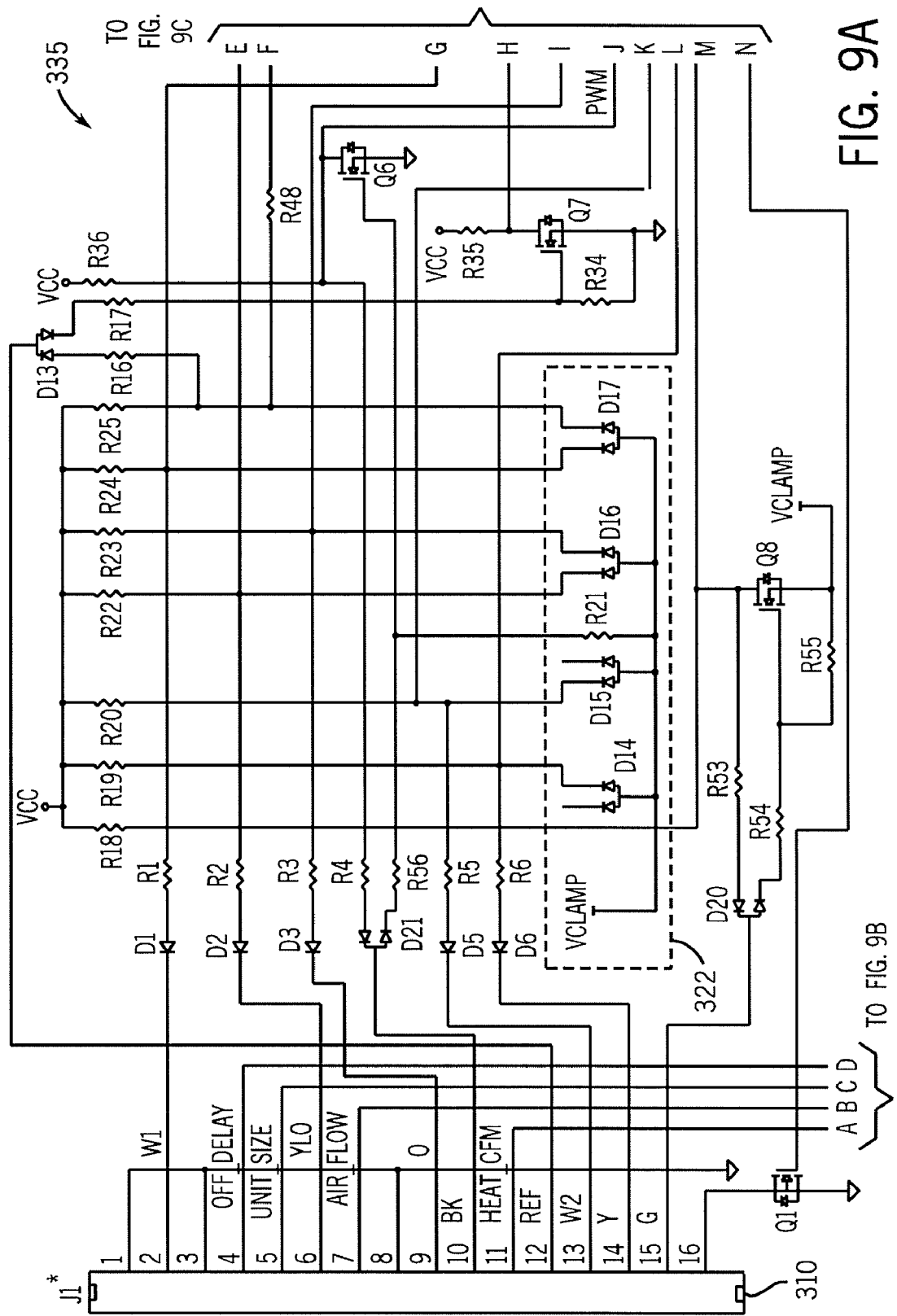

INTERFACE CORD AND SYSTEM INCLUDING AN INTERFACE CORD

RELATED APPLICATIONS

This application is a continuation of U.S. patent application Ser. No. 12/374,840, filed Jan. 23, 2009, which is a national stage filing under 35 U.S.C. 371 of International Application No. PCT/US2007/074977, filed Aug. 1, 2007, which claims the benefit of U.S. Patent Application No. 60/834,698, filed Aug. 1, 2006, all of which are incorporated herein by reference in their entirety.

BACKGROUND

The invention relates to an apparatus and method for uploading and/or communicating information to an electronically commutated motor (ECM) or other programmable field devices.

ECMs are used in many applications. For example, an ECM can be used with a blower or fan for moving air in a heating, ventilating, and air conditioning (HVAC) system or a gas heating system (e.g., a gas water heater or a gas furnace). In such environments, the ECM can employ constant airflow algorithms to control the flow of air without the use of external sensors (e.g., without the use of airflow or pressure sensors). To employ the constant airflow algorithms, the motor controller typically includes information about the system the motor is attached to. Typically this information is programmed into the motor controller at the time of manufacturing.

One problem for servicing a system using an ECM motor that stores system information occurs when replacing the "characterized" or "smart" motor. As just discussed, the original motor may be preprogrammed for a specific system (e.g., a specific furnace/HVAC unit). Service technicians cannot feasibly carry pre-characterized motors for all situations. As a result, when the characterized motor fails, the service technician typically orders a new characterized motor from the manufacturer or distributor. Because this can take several days, a "standard" or "dumb" motor is often installed in the system to keep the system running, while the new characterized motor is delivered. A minimum of two service calls with two motor changes is often the result.

There are some proposed solutions to the problem of replacing a characterized motor. For example, the system control board could include information of the system for uploading to a configurable motor. However, this solution does not solve, among other issues, the problem of replacing ECMs currently installed and operating. In another proposed solution, the service technician could be outfitted with mobile programming capability. This option, which typically requires specialized hardware and/or software, is usually too expensive and complex for some service personnel.

SUMMARY

In one embodiment, the invention provides an apparatus (or system), such as an air-movement system, having a system controller (e.g., a system control board), an electrical machine, and an interface cord connecting the system controller and the electrical machine. The electrical machine can be coupled to a device (e.g., a blower or fan) to be operated by the electrical machine. An exemplary electrical machine includes a motor assembly and a motor controller. The interface cord can communicate signals to the electrical machine generated by or relayed through the system controller. The interface cord can further communicate signals to the system controller generated by or relayed through the electrical machine. The interface cord can include a cable assembly and an integrated circuit board coupled to the cable assembly. The coupling includes, in one construction, integrating the circuit board in the cable assembly. In one construction, the integrated circuit board supports at least a microcontroller, where the microcontroller is operable to receive signals from the system control board in a first format and translate the signals to a second format to be sent to the motor assembly.

In another embodiment, the invention provides a method of controlling a system having an electrical machine and an interface cord. The method includes providing an interface cord having a cable assembly and a circuit board coupled to the cable assembly. The circuit board includes a memory, where the memory includes information (for example, a set of preprogrammed instructions or data) and/or can store information. The method also includes coupling the interface cord to the electrical machine and uploading at least a portion of the information in the memory to the electrical machine. In addition or alternative to the uploading act, the method can include downloading information from the electrical machine to the memory of the interface cord. The method can further include coupling the interface cord to a system control board, communicating signals from the system control board to the electrical machine through the interface cord, and processing the signals from the system control board with a microcontroller of the interface cord. Processing the signals with the microcontroller can include translating signals from a first format to a second format.

In another embodiment, the invention provides an interface cord operable to connect an external controller to an electrical machine. The interface cord includes a first connector having a first pin configuration, a cable coupled to the first connector, a second connector coupled to the cable and having a second pin configuration different from the first pin configuration, and a circuit board having a programmable device electrically coupled in circuit between the first connector and the second connector. The programmable device is configurable to translate a first signal from the first connector to a second signal for the second connector.

In another embodiment, the invention provides an interface cord operable to upload data to an electrical machine. The interface cord includes a first connector, a cable coupled to the first connector, a second connector coupled to the cable, and a circuit board having a programmable device electrically coupled in circuit between the first connector and the second connector. The programmable device includes a memory having data and is configurable to upload the data to the electrical machine.

In another embodiment, the invention provides a motor-cord assembly coupled to an external controller. The motor-cord assembly includes an electrical machine having a motor assembly with a stator and a rotor, and a motor controller connected to the motor assembly and having a first connector with a first pin configuration. The motor-cord assembly also includes an interface cord having a second connector with a second pin configuration different from the first pin configuration, a cable coupled to the second connector, a third connector coupled to the cable and engaging the first connector, and a circuit board having a programmable device electrically coupled in circuit between the second connector and the third connector. The programmable device includes a memory having characterization data and is configurable to selectively upload the characterization data to the electrical machine and to translate a first signal from the second pin configuration to a second signal with the first pin configuration.

In another embodiment, the invention provides a method of operating an electrical machine with an interface cord including a first connector and a second connector, a cable coupled to the first connector and the second connector, and a circuit board having a programmable device electrically coupled in circuit between the first connector and the second connector. The method includes receiving with the first connector a first signal having a first configuration, translating the first signal to a second signal having a second configuration, and generating the second signal from the circuit board and through the cable to the electrical machine.

In another embodiment, the invention provides a method of operating an electrical machine with an interface cord including a first connector and a second connector, a cable coupled to the first connector and the second connector, and a circuit board having a programmable device with a memory, the programmable device being electrically coupled in circuit between the first connector and the second connector. The method includes programming the programmable device with characterization data for operating the electrical machine, coupling the second connector of the interface cord to the electrical machine, and uploading the characterization data to the electrical machine.

In another embodiment, the invention provides a method of operating a circuit that connects a first node to a second node. The circuit includes a connection to a power source, a connection to an electrical ground, a first circuit having a resistor, and a second circuit having a capacitor in parallel configuration with the first circuit. The method includes generating a positive voltage, maintaining the first node above a predetermined threshold, generating a signal in response to detecting a negative voltage with the second node, and drawing a current from the power source as a result of an excessive negative voltage detected with the second node.

In another embodiment, the invention provides a circuit that connects a first node to a second node. The circuit includes a connection to a power source, a connection to an electrical ground, a first circuit having a resistor, and a second circuit having a capacitor in parallel configuration with the first circuit. The first circuit cooperates with the second circuit to generate a reference voltage Other aspects of the invention will become apparent by consideration of the detailed description and accompanying drawings.

BRIEF DESCRIPTION OF THE DRAWINGS

FIG. 2 is a top view of a cable assembly that can be used with the air-movement system of FIG. 1.

FIG. 3 is a frontal view of a plug housing that can be used with the cable assembly of FIG. 2.

FIG. 4 is an elevation view of the plug housing of FIG. 3.

FIG. 9A is a first portion of a circuit diagram of an integrated circuit according to a second construction.

DETAILED DESCRIPTION

Figure 1:
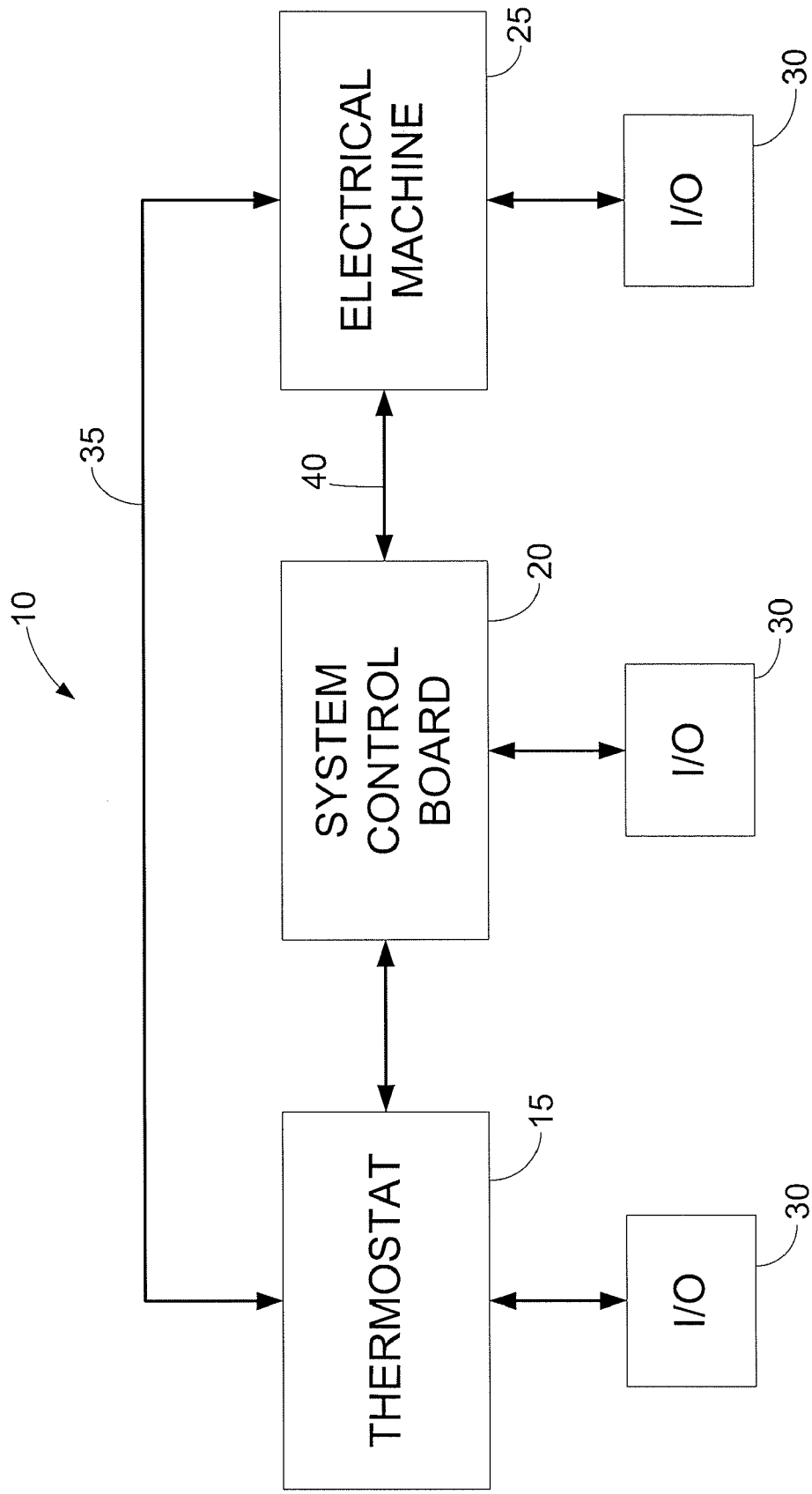
FIG. 1 is a block diagram of an exemplary air-movement system incorporating the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified, limited, or apparent otherwise, the terms "mounted," "connected," "supported," and "coupled" and variations thereof are used broadly and encompass both direct and indirect mountings, connections, supports, and couplings. Further, "connected" and "coupled" are typically not restricted to physical or mechanical connections or couplings.

Although directional references, such as upper, lower, downward, upward, rearward, bottom, front, rear, etc., may be made herein in describing the drawings, these references are made relative to the drawings (as normally viewed) for convenience. These directions are not intended to be taken literally or limit the invention in any form. In addition, terms such as "first", "second", and "third" are used herein for purposes of description and are not intended to indicate or imply relative importance or significance.

In addition, it should be understood that embodiments of the invention include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software based devices, as well as a plurality of different structural components, may be utilized to implement the invention. Furthermore, and as described in subsequent paragraphs, the specific mechanical configurations illustrated in the drawings are intended to exemplify embodiments of the invention and that other alternative mechanical configurations are possible.

FIG. 1 illustrates an exemplary air-movement system (such as a HVAC system 10) including a thermostat 15, a remote or external system controller (shown as system control board 20), an electrical machine 25 having a motor assembly and a motor controller (further explained below), and input/output devices 30. The thermostat 15 is in communication with the system control board 20 and one or more input/output devices 30. Additionally, the thermostat 15 can communicate directly with the electrical machine 25 via a connection 35.

As shown in FIG. 1, the system controller includes the system control board 20. In alternative constructions, the system controller can include multiple boards or can be integrated with the thermostat 15. The system control board 20 is in further communication with the electrical machine 25, via an interface cord 40, and one or more input/output devices 30. The electrical machine 25 is in further communication with one or more input/output devices 30. Each one of the input/output devices 30 is a schematic representation of input signals, output signals, and auxiliary apparatus operating in connection with the thermostat 15, the system control board 20, and the electrical machine 25. The I/O devices 30 can be, for example, other components of the HVAC system 10 and user interfaces. Thus, more than one implementation or construction of the HVAC system 10 is represented by FIG. 1. Further, additional interface cords 40 may be used in the HVAC system 10 for connecting the system control board 20 with one or more of the auxiliary apparatus.

In some constructions, the thermostat 15 shown in FIG. 1 can include input ports, output ports, and a thermostat controller (such as a thermostat circuit board having a microcontroller). Inputs of the thermostat 15 can include signals from temperature sensors, humidity sensors, or other sensors. For some applications, the thermostat 15 may obtain signals (e.g., wirelessly) from temperature sensors in remote locations. Other inputs may include power interfaces to receive power (e.g., from a battery), communication ports to receive software updates, and control interfaces to actively monitor and control the thermostat 15 from a remote location. In yet other constructions, the thermostat 15 can be an analog thermostat with a temperature sensor mounted therein.

The output ports of the thermostat 15 can include a port to send a set of output signals generated by the thermostat 15. For example, the output signals can be indicative of the status of a controlled environmental space. Output signals generated by the thermostat 15 can include heating (W) or cooling (Y), which can be interpreted by the system control board 20 as being "on" or "off." For example, the thermostat 15 can generate a signal W as being "on" (i.e., a request for heat), which is relayed by the system control board 20 to, for example, the electrical machine 25, through the interface cord 40, as a signal instructing the motor to "start". Other signals generated by the thermostat 15 and relayed to the electrical machine 25 through the system control board 20 and the interface cord 40 can include signals W1, W2, and W3, usually indicating requests of three different levels of heating, a fan signal (G), a defrost signal (DF), an outdoor thermistor signal (T), and an emergency heat relay signal (E).

In one construction, the system control board 20 includes input ports, output ports, a switch board, serial ports, and a microcontroller having a processor and a memory. The system control board 20, generally speaking, generates and/or relays signals to the electrical machine 25 through the interface cord 40. The system control board 20 is also operable to communicate with other apparatus, such as humidity control systems, gas burner controls, gas ignition systems, other motors, safety systems, service systems, combustion blowers, etc.

The input ports of the system control board 20 include ports to receive signals such as thermostat signals and safety signals (e.g., from temperature sensors, motion sensors, smoke sensors, etc.). The input ports may include ports to receive wireless signals to reprogram the processor or update information in the memory of the controller. Other ports may receive signals from auxiliary systems or other apparatus of the HVAC system 10, such as gas ignition systems, gas burner controls, and humidity control systems.

In the construction shown in FIG. 1, the system control board 20 communicates with an electrical machine 25 utilizing the interface cord 40. For example, the interface cord 40 may be utilized as a two-way communication device allowing the system control board 20 to send commands to the electrical machine 25 and to receive diagnostics from the electrical machine 25. More generically, the interface cord 40 promotes communication of information between the system control board 20 and the electrical machine 25. As used herein, the term "information" is broadly construed to include signals, instructions, data, etc. conveying at least a piece of knowledge. Depending on the electrical machine 25 and the operational mode of the system control board 20, other information besides commands and diagnostics may be exchanged utilizing the interface cord 40.

Before proceeding further, it is to be understood that the construction of the interface cord 40 is not limited to a wire structure or to the embodiment shown in FIGS. 1-7. The interface cord 40 can incorporate other constructions that fall within the scope of the cord 40 described herein, and can be used in other applications that extend beyond the HVAC system shown. Additionally, while the electrical machine 25 is shown connected to a blower or a fan, the electrical machine can be other types of machines.

Figure 8:
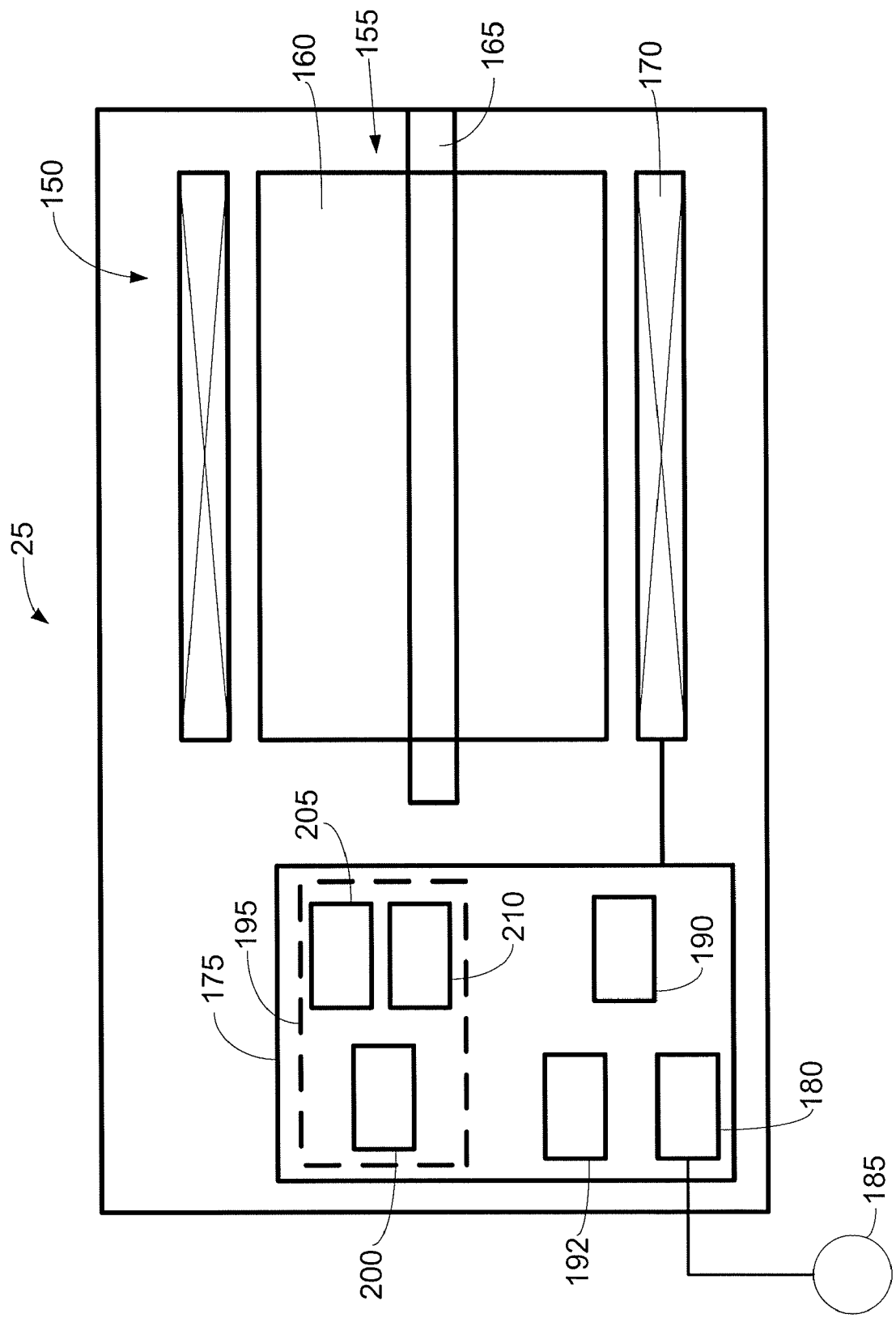
FIG. 8 illustrates an exemplary schematic representation of the motor assembly of FIG. 1.

Referring to the construction shown in FIG. 8, an exemplary schematic representation of the electrical machine 25 is shown including a motor assembly 150 having a rotor 155, which includes a rotor core 160 mounted on a shaft 165, and a stator 170. The rotor 155 is generally supported by one or more bearings and is coupled to the blower. The stator 170 includes a stator core and one or more windings disposed on the stator core. The electrical machine 25 also includes a motor controller 175 electrically connected to the motor assembly 150. More specifically, the windings of the stator 170 are electrically connected to the motor controller 175. In general, the motor controller 175 is configured to interact with the system control board 20 and supply a voltage to, or control a current of, the windings in response to commands from the system control board 20 and/or the interface cord 40 (further explained below). For example, the motor controller 175 causes a varying magnetic field in the stator 170 to interact with a magnetic field of the rotor 160, causing rotation of the rotor assembly 155 and consequently of the blower.

As shown in FIG. 8, the motor controller 175 can include a power supply 180 having rectifiers and filters, for example. The power supply 180 is generally operable to receive power from a power source 185 and to produce one or more voltages (e.g., a bus voltage and a logic voltage). The motor controller 175 can also include an inverter 190, input/output circuitry 192 to interact with input/output devices 30 (e.g., the interface cord 40), and a microcontroller 195 having a processor 200, a program memory 205, and a configuration memory 210. Generally, the processor 200 reads, interprets, and executes instructions stored in the program memory 205 to control the motor controller assembly 175, while the configuration memory 210 is usually designated to store data (e.g., characterization data).

The microcontroller 195 can also include other programmable devices and components, such as a power supply, an analog-to-digital converter, filters, and other generally known components. The microcontroller 195 is generally configured to issue drive signals to control the inverter 190. The inverter 190 can include power electronic switches (e.g., MOSFETs, IGBTs) to vary the flow of current to the motor 150. For example, and in one construction, the inverter 190 can be in the form of a bridge circuit. In other constructions, the motor controller assembly 175 can include other components known to those skilled in the art, but not discussed herein. For example, the motor controller assembly 175 can include a driver circuit, voltage sensors, current sensors, back-EMF sensors, etc. It should also be understood that other motor controller assemblies can be used in the HVAC system. Moreover, FIG. 8 makes reference to a brushless, permanent magnet motor, however, other motor types are possible. Before proceeding further, it is to be understood that other programmable devices can be used in place of the microcontroller 195. For example, other programmable devices can perform the same or similar operations and include elements such as the program memory 205 the configuration memory 210. In addition, even though the program memory 205 and the configuration memory 210 are shown separately (FIG. 8), other configurations are possible (e.g., an external memory or a single memory device).

FIG. 2 illustrates a cable assembly 45, which is a part of the interface cord 40, according to one construction. The shown cable assembly 45 is a serial cable including a first end 50, a second end 55, and four wires 60. At the first end 50, each of the four wires 60 includes a socket lead 65 for connecting the wires 60 of the cable assembly 45 to a connecting plug housing 70 (shown in FIGS. 3-4). The wires 60 at the second end 55 are generally coupled to a printed circuit board (PCB) 75 (shown in FIGS. 5-6) by clamping, soldering, or clipping the wires 60 to the PCB 75. Other methods or devices for coupling the wires 60, at the second end of the cable assembly 45, to the PCB 75 can be used.

FIGS. 3-4 illustrate an exemplary plug housing 70 for receiving wires 60 from the first end 50 of the cable assembly 45 and coupling the cable assembly 45 to the electrical machine 25. The plug housing 70 includes four sockets 80, for receiving the four wires 60, a connection end 85, and a coupling mechanism 90. During assembly of the interface cord 40, the connection end 85 engages an input port of the electrical machine 25 and the coupling mechanism 90 locks the interface cord 40 to the electrical machine 25 to promote proper connection between the connection end 85 and the input port of the electrical machine 25. It is to be understood that the plug housing 70 may have other constructions.

Figure 5:
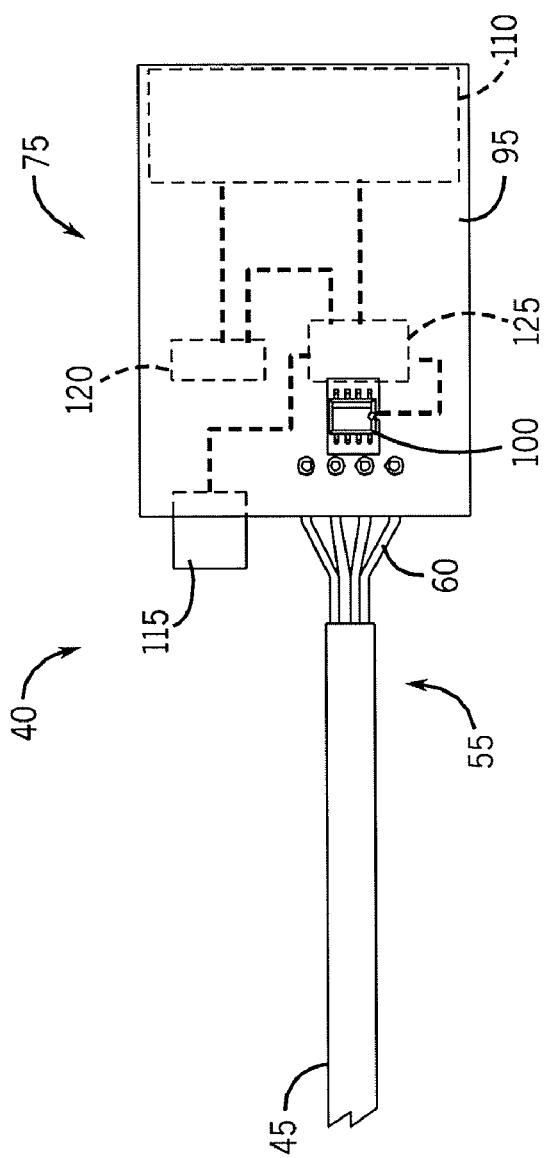
FIG. 5 is a bottom view of an exemplary integrated circuit coupled to the cable assembly FIG. 2 according to a first construction.
Figure 6:
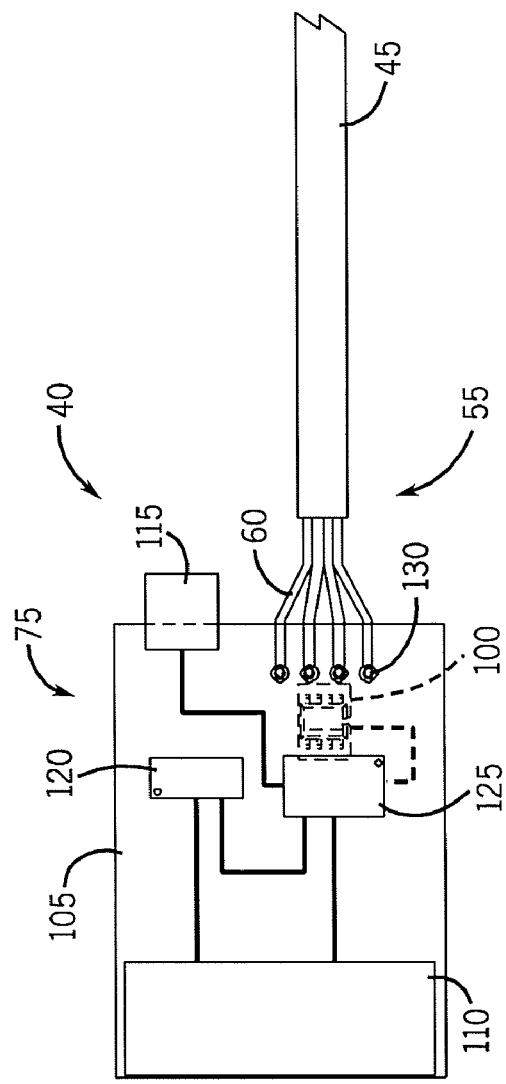
FIG. 6 is a top view of the integrated circuit and cable assembly illustrated in FIG. 5.

FIG. 5 is a bottom view of the interface cord 40 showing the second end 55 of the cable assembly 45 and a bottom face 95 of the PCB 75. Among other elements of the PCB 75, the bottom face 95 includes a first circuit element 100 identified as a logic circuit. FIG. 6 is a top view of the interface cord 40 showing the second end 55 of the cable assembly 45 and a top face 105 of the PCB 75. Among other elements of the PCB 75, the top face 105 includes a second circuit element 110 identified as a connector, a third circuit element 115 identified as a programming header, a fourth circuit element 120 identified as an optically coupled isolator or coupler, and a fifth circuit element 125 identified as a microcontroller. FIG. 6 also shows wires 60 at the second end 55 of the cable assembly 45 coupled to the PCB 75 by cable connectors/terminals 130. It is to be understood that the circuit elements identified above are only for illustration purposes, that the PCB 75 may include other circuit elements not described herein, and that the PCB 75 does not require all the circuit elements shown. In one exemplary construction, the circuit element 100 is a low power transceiver that promotes two-way serial communication between the interface cord 40 and the electrical machine 25, the circuit element 110 is a 16-pin header and circuit element 115 is a 6-pin header each operable to receive suitable wire connectors, the circuit element 120 is an optically coupled isolator with light emitting diodes, and the circuit element 125 is a programmable microcontroller.

Figure 7:
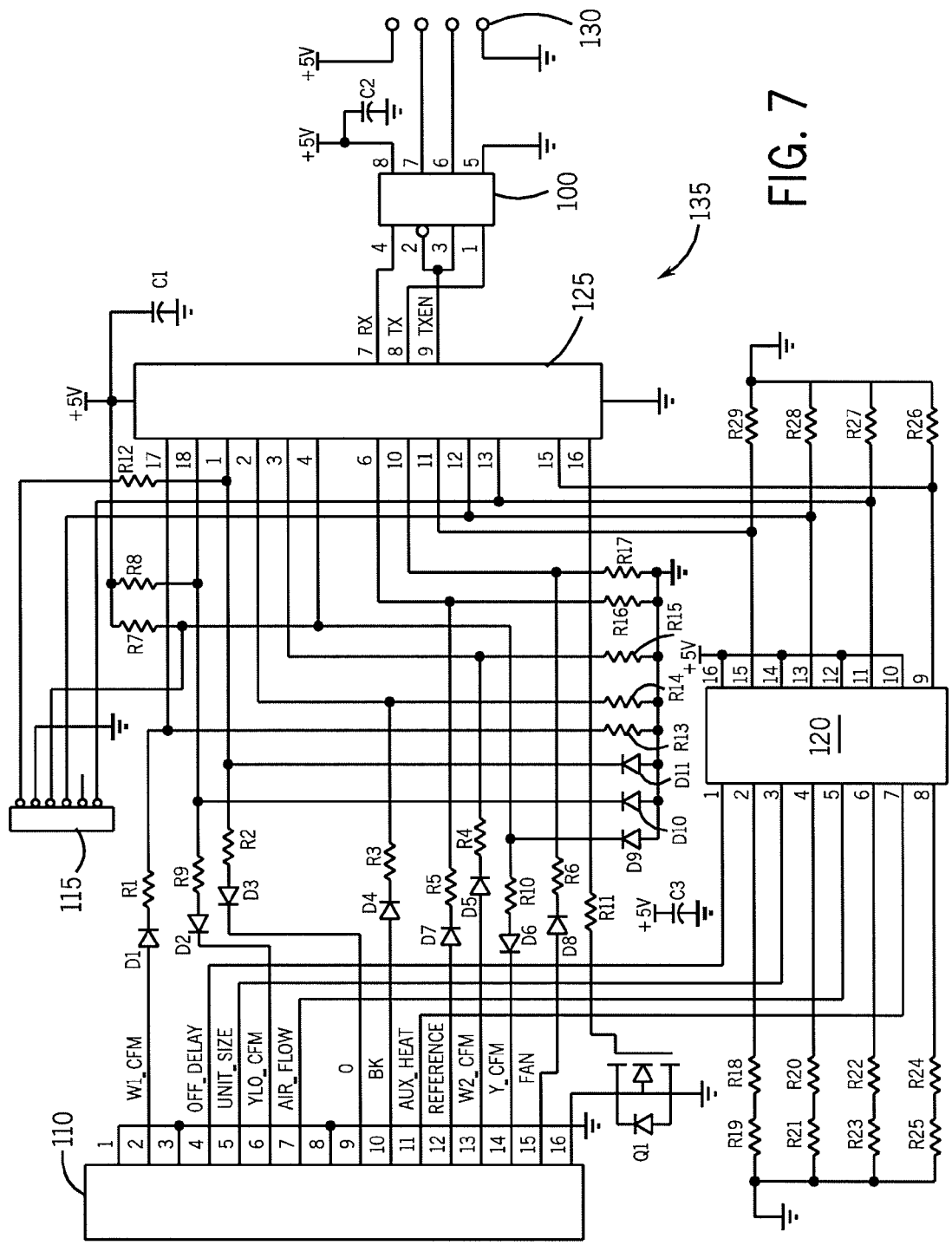
FIG. 7 is a circuit diagram of the integrated circuit illustrated in FIGS. 5 and 6.

FIG. 7 is a schematic circuit diagram 135 of the PCB 75 shown in FIGS. 5 and 6. The circuit diagram 135 includes the logic circuit 100, connector 110, the programming header 115, the coupler 120, and the microcontroller 125. FIG. 7 also shows schematically cable connectors 130. In one construction, the connector 110 is operable to receive signals from the system control board 20 and other input/output devices 30. For example, the connector 110 can include a 16-pin connector receiving signals that are at least partially indicative of thermostat output signals, system control board settings, and the status of the HVAC system 10 shown in FIG. 1. The connector 110 routes the received signals to the coupler 120 and the microcontroller 125. In some constructions, the microcontroller 125 and other circuit elements of the interface cord 40 are powered by the electrical machine 25. In other constructions, the interface cord 40 includes a power source or is powered by the system control board 20.

The coupler 120 is generally configured to provide signal rectification for at least some of the signals received by the connector 110. At least some of the signals received by the coupler 120 are AC (positive half wave, negative half wave, or full AC) and are used to turn on the output transistors of the coupler 120. The signals processed by the coupler 120 are subsequently routed to the microcontroller 125.

Similar to other microcontrollers (or other programmable devices) discussed herein, the microcontroller 125 can include a processor, one or more memories for storing instructions (program commands) and for storing data, and other elements normally associated with microcontrollers. The microcontroller 125 is generally configured to operate based on signals from specific elements of the HVAC system 10, such as the system control board 20 or electrical machine 25. The microcontroller 125, in one construction, receives incoming signals from a first apparatus, translates or processes the received signals from a first format to a second format, and transmits outgoing signals having the second format to a second apparatus. For example, the interface cord 40 is operable to receive a first signal with a first pin configuration, corresponding to the number of pins the connector 110 can receive, and translate the first signal to a second signal for serial communication generated by the microcontroller 125 and sent via the connector or terminal 130. In other constructions, the interface cord 40 can receive a first signal with a first configuration and generate a second signal with the first configuration. In another example, the microcontroller 125 is operable to receive incoming signals from the system control board 20, translate and/or process the incoming signals to generate a command, and transmit the command to the electrical machine 25. The command generated by the microcontroller 125 is routed to the logic circuit 100 to be sent serially through the cable connectors 130.

The microcontroller 125 can also allocate memory to support preprogrammed instructions indicative of settings for the electrical machine 25. The microcontroller 125 can also include information indicative of the structural characteristics of the HVAC system, or can be used to characterize the motor for a particular system. For example, the microcontroller 125 can include characterization data related to the thermostat 15, the system control board 20 and/or the electrical machine 25. Moreover, the interface cord 40 can upload the characterization data to the electrical machine 25 as a result of connecting the interface cord 40 to the electrical machine 25.

In some cases, the system control board 20 needs not to be coupled with the interface cord 40 for the interface cord 40 to upload the configuration data to the electrical machine 25. The interface cord 40 can be powered by the electrical machine 25. Accordingly, the electrical machine 25 and the interface cord 40 can operate as a motor-cord assembly independently from the system control board 20 and the thermostat 15, for example.

In some constructions, the programming header 115 can be used to upload information to the microcontroller 125. In cases where the microcontroller 125 is preprogrammed, the programming header 115 can be an optional circuit element of the PCB 75. It is also envisioned that the microcontroller 125 can receive and store information from the electrical machine 25; for example, to mirror information stored at the electrical machine 25.

One application of the interface cord 40 includes the use of a preprogrammed interface cord 40 to assist in the replacing of a motor that may be obsolete or damaged. For example, a technician may be required to replace a motor from an HVAC system with specific characteristics not known by the technician before arriving to the site. The technician can use a generic replacement motor and a number of preprogrammed interface cords, such as the interface cord 40 described above. Each interface cord 40 can include a microcontroller with a set of instructions and/or characterization data related to various configurations of the HVAC system. The technician can then install the replacement motor and test various interface cords to determine the interface cord with the appropriate set of instructions and/or data. In some cases, the technician can also make adjustments to the microcontroller through the programming header when necessary.

The interface cord 40 may also be used in applications where HVAC systems may require the use of motors with different power ratings, such as ⅓ HP, ½ HP, ¾ HP, and 1 HP. In this particular case, a technician required to replace a motor with an unknown power rating can utilize a ½ HP motor or a 1 HP motor to replace the faulty motor. For example, if the HVAC system requires the use of a ⅓ HP motor, the technician may exchange the faulty motor with a ½ HP motor. Furthermore, the interface cord can include instructions, or the technician may adjust existing ones, for the ½ HP motor to operate properly with the HVAC system. The use of the interface cord 40 permits the technician to carry only two motor instead of four when servicing this type of HVAC system.

In another application, the interface cord 40 can be utilized to mirror data and information from the electrical machine 25. More specifically, the interface cord 40 can receive information from the electrical machine 25 and the system control board 20, and record or save the information. The information can include characterization data, status of the HVAC system, data from memories 205 and 210 in the microcontroller 195, and other suitable data. The information recorded by the interface cord 40 can be retrieved by a technician through the programming header 115 for diagnostic purposes, for example. In another example, when the motor needs to be replaced, the technician can replace the faulty motor with a generic motor. In this particular case, the interface cord 40 can upload the recorded information to the generic motor or reprogram the motor (if the motor is preprogrammed from factory). Thus, the motor can operate in the HVC system without having the technician reprogram the motor or adjust preprogrammed information in the motor. Other applications outside HVAC systems may be possible and fall within the scope of the invention.

Figure 9B:
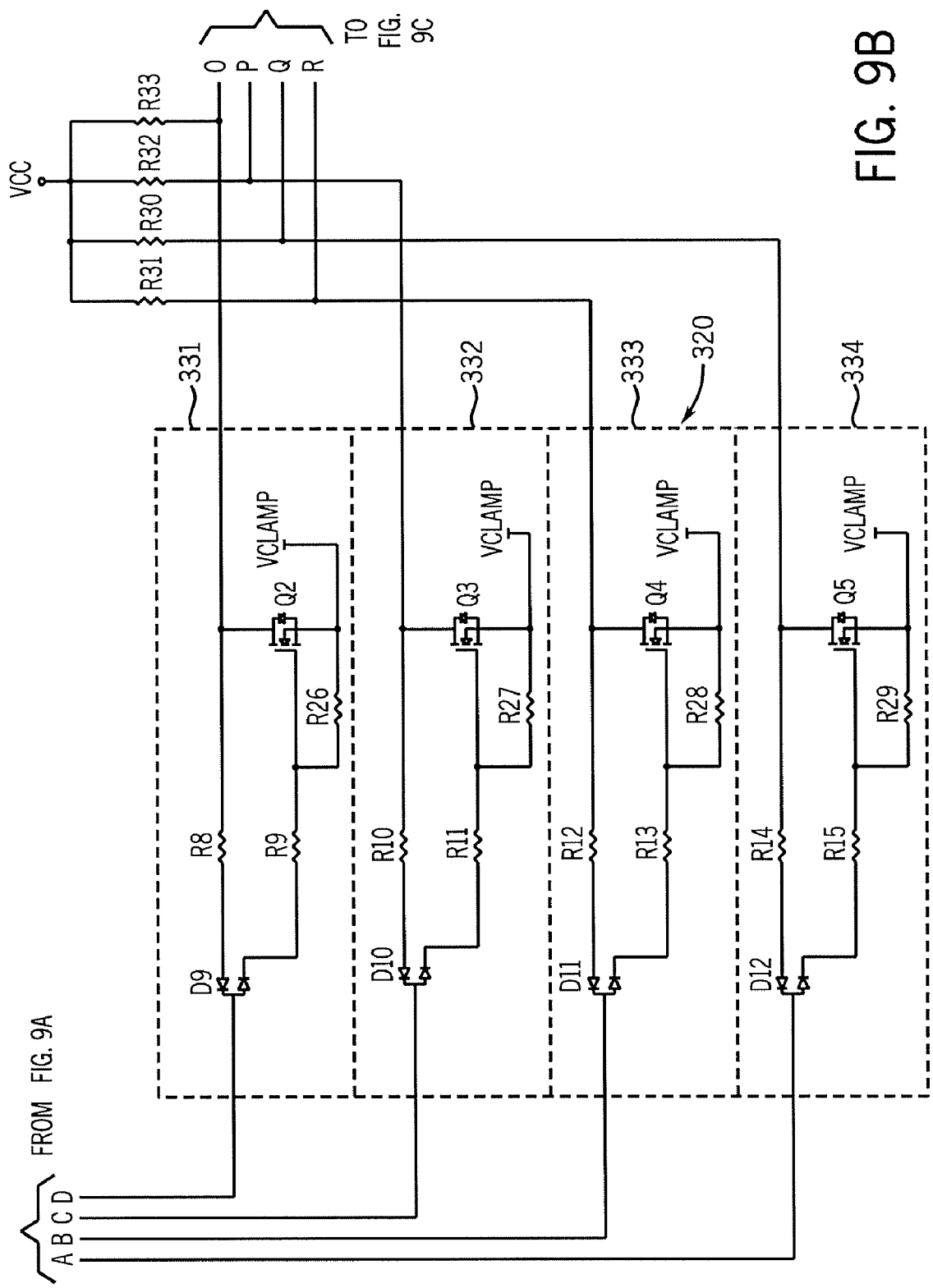
FIG. 9B is a second portion of the circuit diagram of the integrated circuit according to a second construction.
Figure 9C:
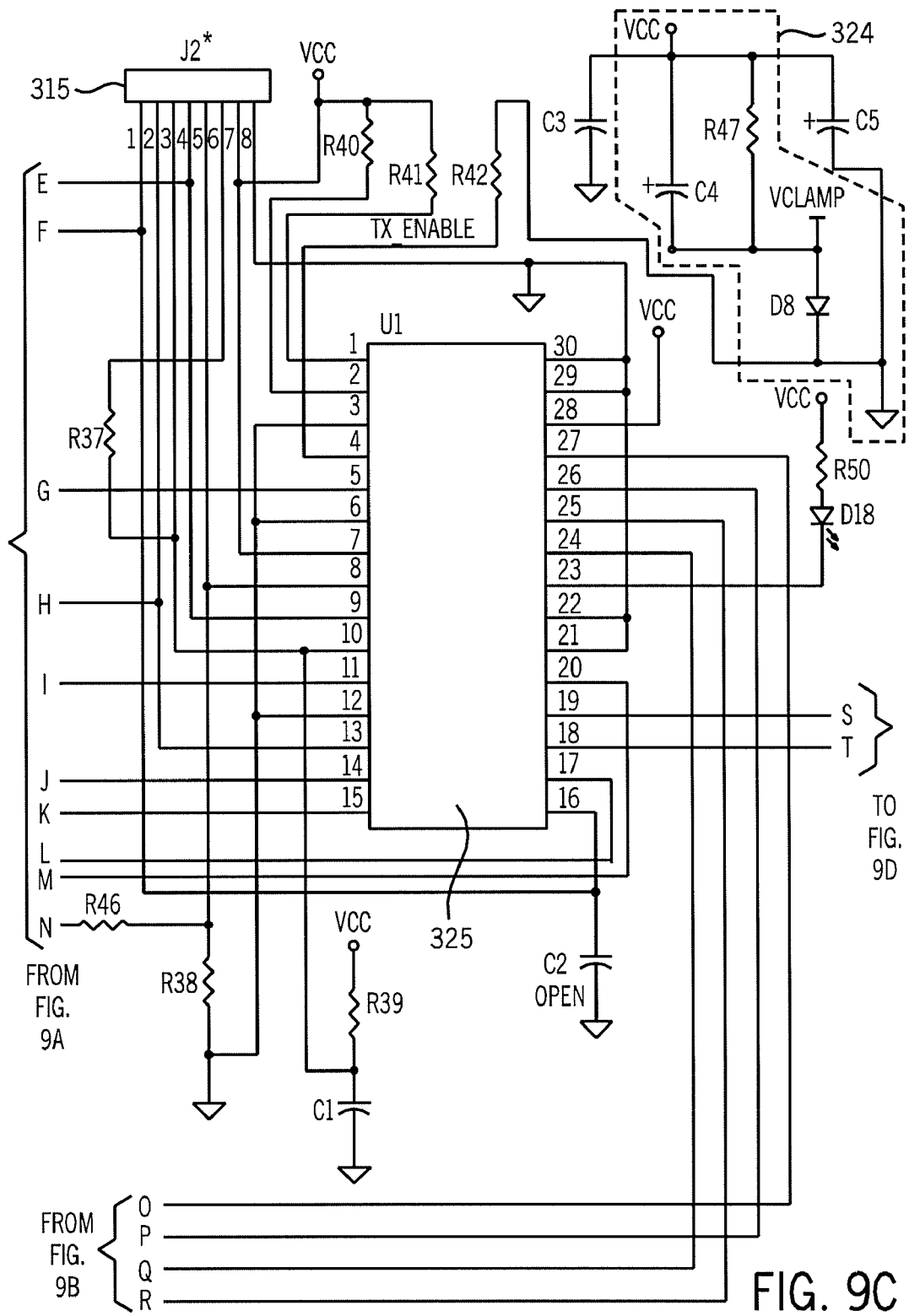
FIG. 9C is a third portion of the circuit diagram of the integrated circuit according to a second construction.
Figure 9D:
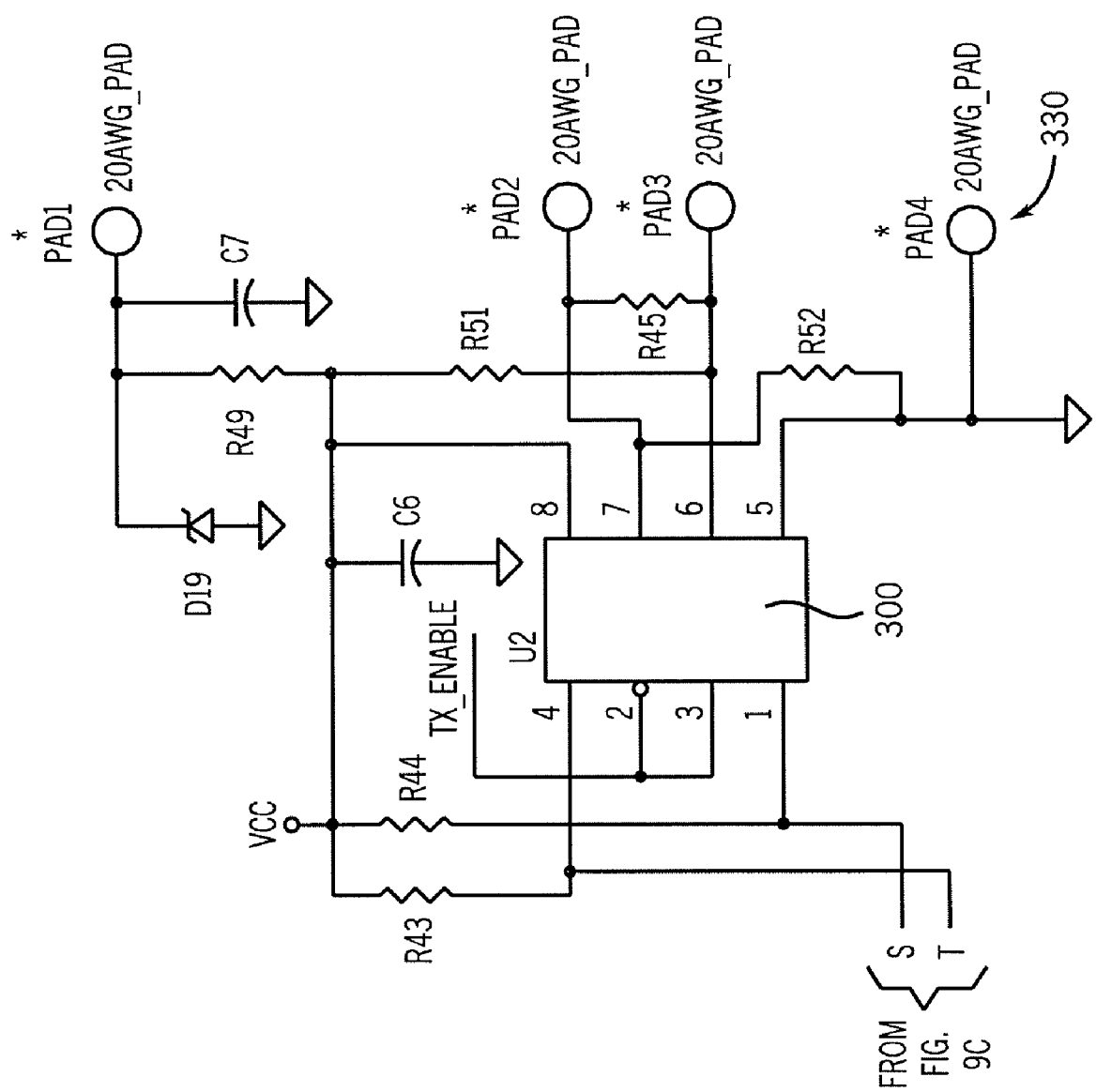
FIG. 9D is a fourth portion of the circuit diagram of the integrated circuit according to a second construction.
Figure 10A:
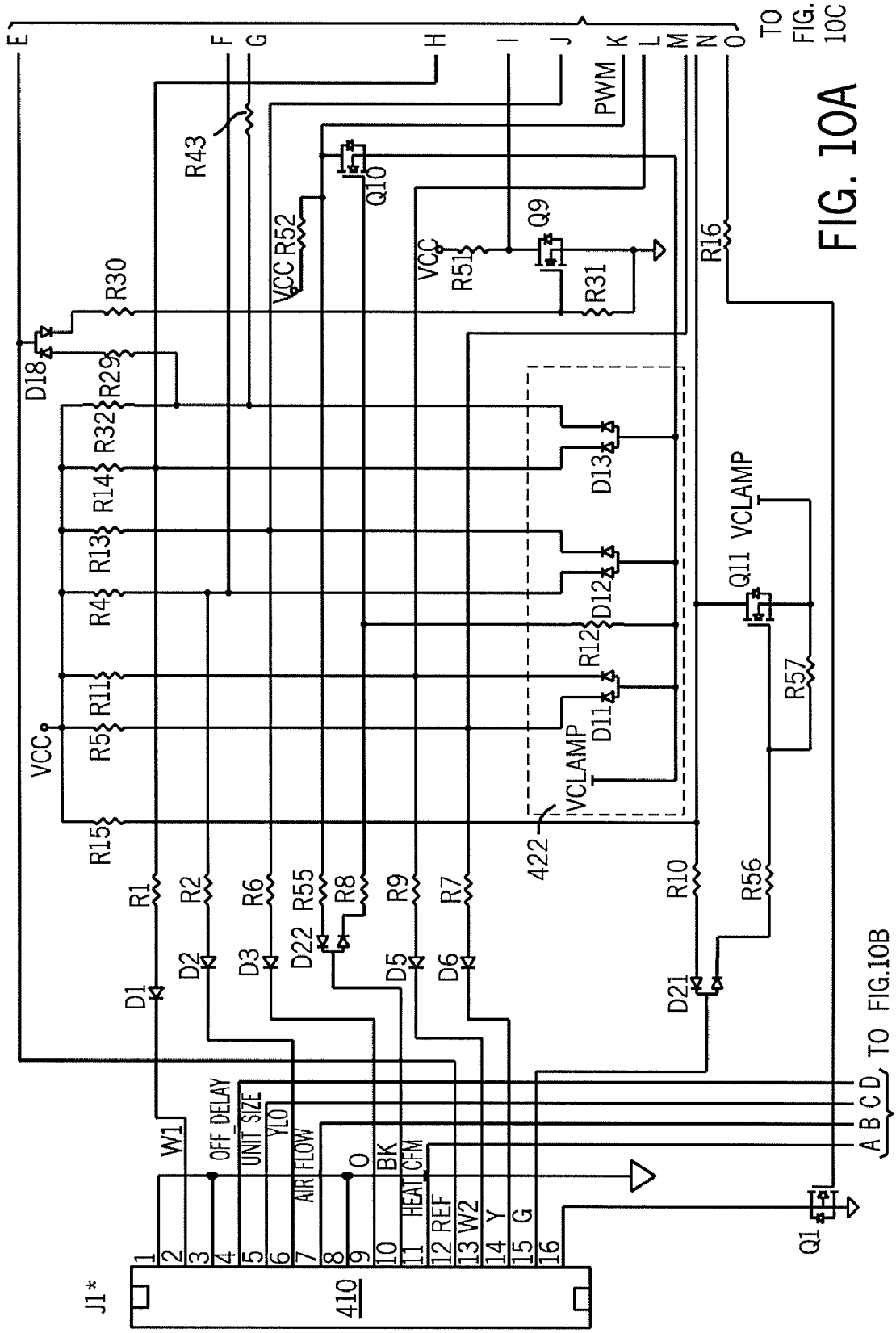
FIG. 10A is a first portion of a circuit diagram of an integrated circuit according to a third construction.
Figure 10B:
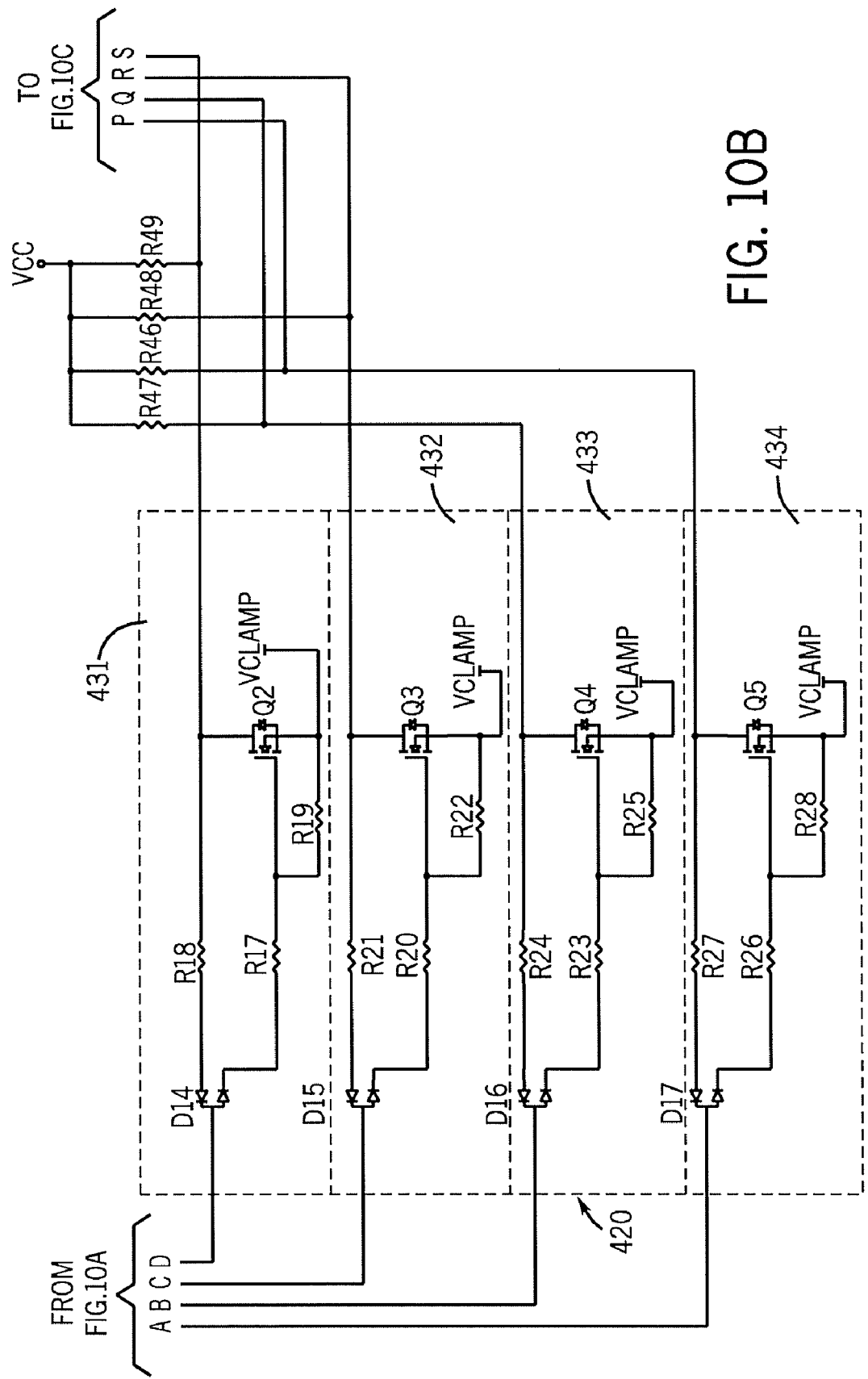
FIG. 10B is a second portion of the circuit diagram of the integrated circuit according to a third construction.
Figure 10C:
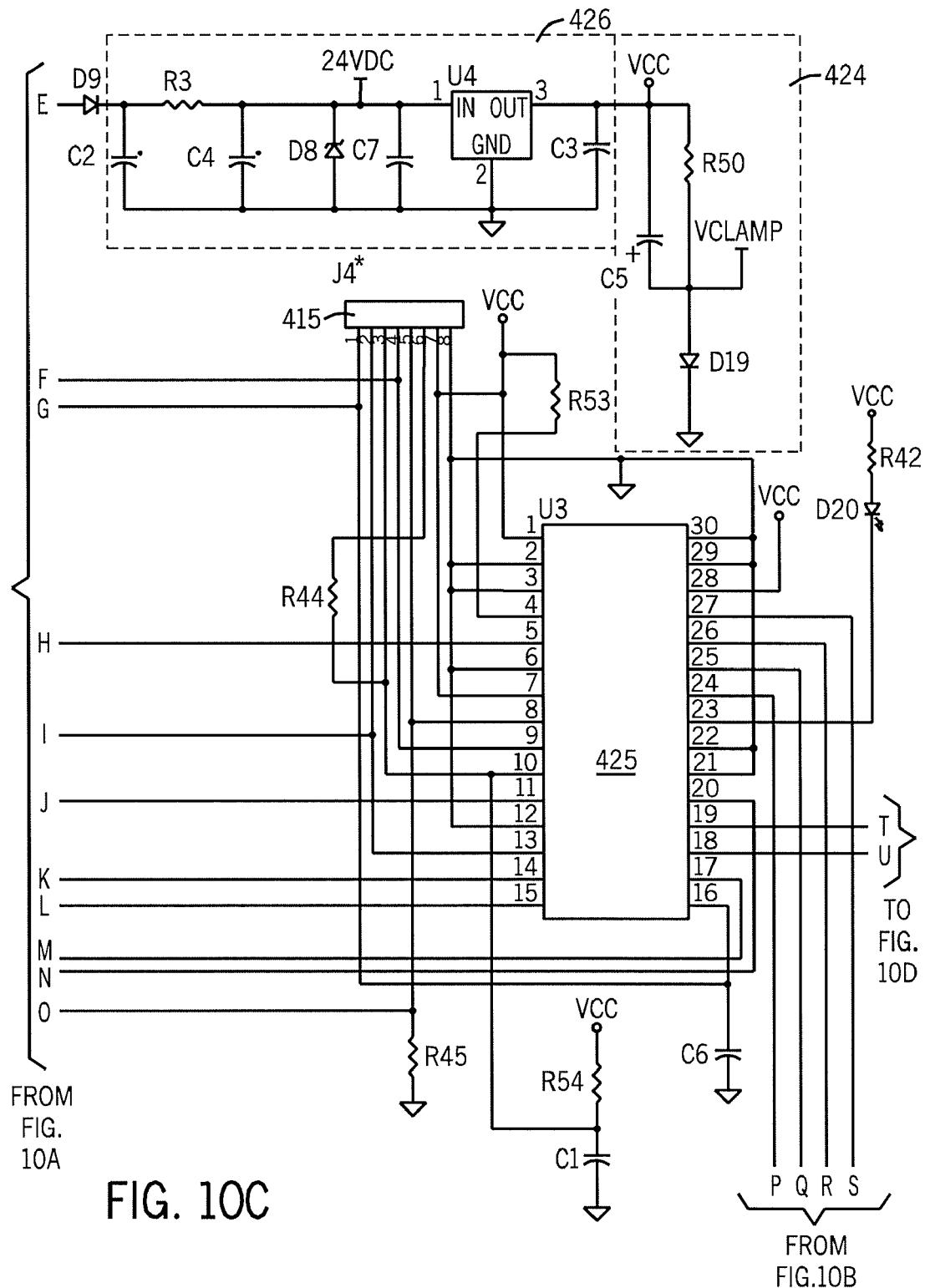
FIG. 10C is a third portion of the circuit diagram of the integrated circuit according to a third construction.
Figure 10D:
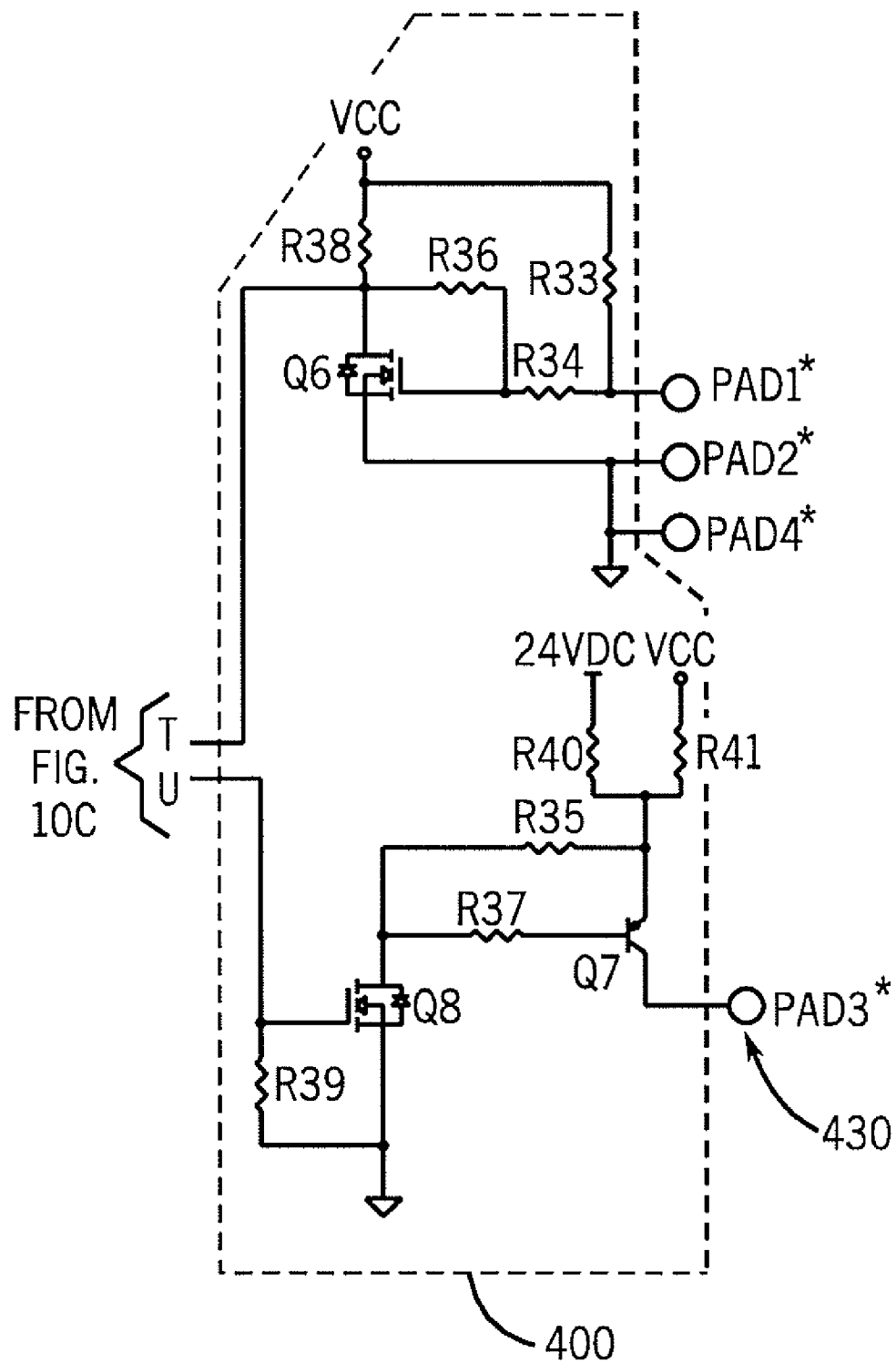
FIG. 10D is a fourth portion of the circuit diagram of the integrated circuit according to a third construction.

FIG. 9 is a circuit diagram of an additional construction of the integrated circuit of the interface cord 40. This embodiment employs much of the same structure and has many of the same properties as the circuit described above in connection with FIG. 7. Accordingly, the following description focuses primarily upon the structure and features that are different than the circuit described above in connection with FIG. 7. Reference should be made to the description above in connection with FIG. 7 for additional information regarding the structure and features, and possible alternatives to the structure and features of the circuit illustrated in FIG. 9 and described below. Structure and features of the circuit shown in FIG. 9 that correspond to structure and features of the circuit of FIG. 7 are designated hereinafter in the 300 series of reference numbers, respectively.

The circuit 335 includes a logic circuit 300, a connector 310, a programming header 315, a coupler circuit 320, a protector circuit 322, a voltage-clamp circuit 324, and a programmable device (e.g., a microcontroller) 325. FIG. 9 also schematically shows cable connectors 330. In the illustrated construction, the connector 310 is operable to receive signals from the system control board 20 and other input/output devices 30. For example, the connector 310 includes a 16-pin connector receiving signals that are at least partially indicative of thermostat output signals, system control board settings, and the status of the HVAC system 10 shown in FIG. 1. The connector 310 routes the received signals to the coupler circuit 320 and the programmable device 325.

The coupler circuit 320 is generally configured to provide signal rectification for at least some of the signals received by the connector 310. At least some of the signals received by the coupler circuit 320 are AC (positive half wave, negative half wave, or full AC) and can be used to turn on light emitting transistors, for example. The signals processed by the coupler 320 are subsequently routed to the programmable device 325. In the construction illustrated in FIG. 9, four signals (e.g., Off-Delay, Unit Size, Air Flow, Heat CFM) are routed from the connector 310 to the coupler circuit 320. Each signal routed to the coupler circuit 320 is processed in a corresponding coupler sub-circuit 331, 332, 333, 334. Each coupler sub-circuit 331, 332, 333, 334 receives a clamp voltage generated by the voltage-clamp circuit 324 and includes a diode (D9, D10, D11, D12), a field effect transistor or FET (Q2, Q3, Q4, Q5), a first resistor (R8, R10, R12, R14), a second resistor (R9, R11, R13, R15), and a third resistor (R26, R27, R28, R29).

In addition, the protector circuit 322 affects some of the signals received by the connector 310 and routed to the programmable device 325 (e.g., Y, W1, W2, YLO, O). In the illustrated construction, the protector circuit 322 includes four diodes (D14, D15, D16, D17), such as high speed double diodes, each coupled by the anode to the clamp voltage generated by the voltage-clamp circuit 324. The diodes of the protector circuit 322 utilize the clamp voltage to prevent a signal received by the connector 310 from damaging or causing a malfunction of the programmable device 325 (as further described below). The voltage-clamp circuit 324 generating the clamp voltage includes a connection to a power source VCC, a capacitor C4, a resistor R47 in parallel configuration with capacitor C4, and a diode D8 coupled to ground.

Similar to other programmable devices, the programmable device 325 can include a processor, one or more memories for storing instructions (program commands) and for storing data, and other elements normally associated with programmable devices. The programmable device 325 can include a microcontroller, such as the Microchip PIC16F648A and the NEC PD78F9234 microcontrollers, for example. The programmable device 325 is generally configured to operate based on signals from specific elements of the HVAC system 10, such as the system control board 20 or electrical machine 25. The programmable device 325, in one construction, receives incoming signals from a first apparatus, translates or processes the received signals from a first format to a second format, and transmits outgoing signals having the second format to a second apparatus.

For example, the interface cord 40 including the PCB with circuit 335 is operable to receive a first signal with a first pin configuration, corresponding to the number of pins the connector 310 can receive, and translate the first signal to a second signal for serial communication generated by the programmable device 325 and sent via the logic circuit 300 and connector 330. In some constructions, the logic circuit 300 can include a line driver circuit and/or a level shifter circuit promoting serial communication. In other constructions, the interface cord 40 can receive a first signal with a first configuration and generate a second signal with the first configuration. In another example, the programmable device 325 is operable to receive incoming signals from the system control board 20, translate and/or process the incoming signals to generate a command, and transmit the command to the electrical machine 25. The command generated by the programmable device 325 is routed to the logic circuit 300 to be sent serially through the cable connectors 330.

The programmable device 325 can also allocate memory to support preprogrammed instructions indicative of settings for the electrical machine 25. The programmable device 325 can also include information indicative of the structural characteristics of the HVAC system, or can be used to characterize the motor for a particular system. For example, the programmable device 325 can include characterization data related to the thermostat 15, the system control board 20 and/or the electrical machine 25. Moreover, the interface cord 40 can upload the characterization data to the electrical machine 25 as a result of connecting the interface cord 40 to the electrical machine 25. In some cases, the system control board 20 needs not to be coupled with the interface cord 40 for the interface cord 40 to upload the configuration data to the electrical machine 25. The interface cord 40 can be powered by the electrical machine 25. Accordingly, the electrical machine 25 and the interface cord 40 with the PCB illustrated with circuit diagram 335 can operate as a motor-cord assembly independently from the system control board 20 and the thermostat 15, for example.

In some constructions, the programming header 315 can be used to upload information to the programmable device 325. In cases where the programmable device 325 is preprogrammed, the programming header 315 can be an optional circuit element of the PCB. For example, the manufacturing process of the programmable device 325 can include uploading, and permanently storing characterization and/or system information/data, via a serial connection defined by the connector 330 and the logic circuit 300. In other words, data can be stored or uploaded to the programmable device 325 during the manufacturing process and prior to utilizing the interface cord 40 in an HVAC application, for example. Accordingly, it is envisioned that the programmable device 325 can also receive and store information from the electrical machine 25 to mirror information stored at the electrical machine 25.

FIG. 10 is a circuit diagram of an additional construction of the integrated circuit of the interface cord 40. This circuit employs much of the same structure and has many of the same properties as the circuits described above in connection with FIGS. 7 and 9. Accordingly, the following description focuses primarily upon the structure and features that are different than the circuits described above in connection with FIGS. 7 and 9. Reference should be made to the description above in connection with FIGS. 7 and 9 for additional information regarding the structure and features, and possible alternatives to the structure and features of the circuit illustrated in FIG. 10 and described below. Structure and features of the circuit shown in FIG. 10 that correspond to structure and features of the embodiment of FIGS. 7 and 9 are designated hereinafter in the 400 series of reference numbers, respectively.

The circuit 435 includes a gate circuit 400, a connector 410, a programming header 415, a coupler circuit 420, a protector circuit 422, a voltage-clamp circuit 424, a power supply circuit 426, and a programmable device (e.g., a microcontroller) 425. FIG. 10 also schematically shows cable connectors 430 connected to the gate circuit 400. In the illustrated construction, the gate circuit 400 includes nine resistors R33, R34, R35, R36, R37, R38, R39, R40, R41, and three transistors Q6, Q7, Q8. The connector 410 is operable to receive signals from the system control board 20 and other input/output devices 30. For example, the connector 410 includes a 16-pin connector receiving signals that are at least partially indicative of thermostat output signals, system control board settings, and the status of the HVAC system 10 shown in FIG. 1. The connector 410 routes the received signals to the coupler circuit 420 and the programmable device 425.

The coupler circuit 420 is generally configured to provide signal rectification for at least some of the signals received by the connector 410. At least some of the signals received by the coupler circuit 420 are AC (positive half wave, negative half wave, or full AC) and can be used to turn on light emitting transistors, for example. The signals processed by the coupler 420 are subsequently routed to the programmable device 425. In the construction illustrated in FIG. 10, four signals (e.g., Off-Delay, Unit Size, Air Flow, Heat CFM) are routed from the connector 410 to the coupler circuit 420. Each signal routed to the coupler circuit 420 is processed in a corresponding coupler sub-circuit 431, 432, 433, 434. Each coupler sub-circuit 431, 432, 433, 434 receives a clamp voltage generated by the voltage-clamp circuit 424 and includes a diode (D14, D15, D16, D17), a field effect transistor or FET (Q2, Q3, Q4, Q5), a first resistor (R18, R21, R24, R27), a second resistor (R17, R20, R23, R26), and a third resistor (R19, R22, R25, R28).

In addition, the protector circuit 422 affects some of the signals received by the connector 410 and routed to the programmable device 425 (e.g., Y, W1, W2, YLO, O, BK). In the illustrated construction, the protector circuit 422 includes three diodes (D11, D12, D13), such as high speed double diodes, each coupled by the anode to the clamp voltage generated by the voltage-clamp circuit 424. The diodes of the protector circuit 422 utilize the clamp voltage to prevent a signal received by the connector 410 from damaging or causing a malfunction of the programmable device 425 (as further described below). The voltage-clamp circuit 424 generating the clamp voltage includes a connection to a power source VCC, a capacitor C5, a resistor R50 in parallel configuration with capacitor C5, and a diode D19 coupled to ground.

Similar to other programmable devices, the programmable device 425 can include a processor, one or more memories for storing instructions (program commands) and for storing data, and other elements normally associated with programmable devices. The programmable device 425 can include a microcontroller, such as the Microchip PIC16F648A and the NEC PD78F9234 microcontrollers, for example. The programmable device 425 is generally configured to operate based on signals from specific elements of the HVAC system 10, such as the system control board 20 or electrical machine 25. The programmable device 425, in one construction, receives incoming signals from a first apparatus, translates or processes the received signals from a first format to a second format, and transmits outgoing signals having the second format to a second apparatus.

For example, the interface cord 40 including the PCB illustrated with circuit diagram 435 is operable to receive a first signal with a first pin configuration, corresponding to the number of pins the connector 410 can receive, and translate the first signal to a second signal for serial communication generated by the programmable device 425 and sent via the gate circuit 400 and connectors 430. In other constructions, the interface cord 40 can receive a first signal with a first configuration and generate a second signal with the first configuration. In another example, the programmable device 425 is operable to receive incoming signals from the system control board 20, translate and/or process the incoming signals to generate a command, and transmit the command to the electrical machine 25. The command generated by the programmable device 425 is routed to the gate circuit 400 to be sent through the cable connectors 430.

The programmable device 425 can also allocate memory to support preprogrammed instructions indicative of settings for the electrical machine 25. The programmable device 425 can also include information indicative of the structural characteristics of the HVAC system, or can be used to characterize the motor for a particular system. For example, the programmable device 425 can include characterization data related to the thermostat 15, the system control board 20 and/or the electrical machine 25. Moreover, the interface cord 40 can upload the characterization data to the electrical machine 25 as a result of connecting the interface cord 40 to the electrical machine 25. In some cases, the system control board 20 needs not to be coupled with the interface cord 40 for the interface cord 40 to upload the configuration data to the electrical machine 25.

In the illustrated construction, the PCB with circuit 435 includes the power supply circuit 426 having a voltage regulator U4, a Zener diode D8, four capacitors C2, C3, C4, C7, and a resistor R3. The power supply circuit 426 allows the interface cord 40 to draw power through the connector 410, unlike other constructions (e.g., circuits 135 and 335) in which power is drawn through the connectors 130 and 330, for example.

In some constructions, the programming header 415 can be used to upload information to the programmable device 425. In cases where the programmable device 425 is preprogrammed, the programming header 415 can be an optional circuit element of the PCB. It is also envisioned that the programmable device 425 can receive and store information from the electrical machine 25; for example, to mirror information stored at the electrical machine 25.

Figure 11A:
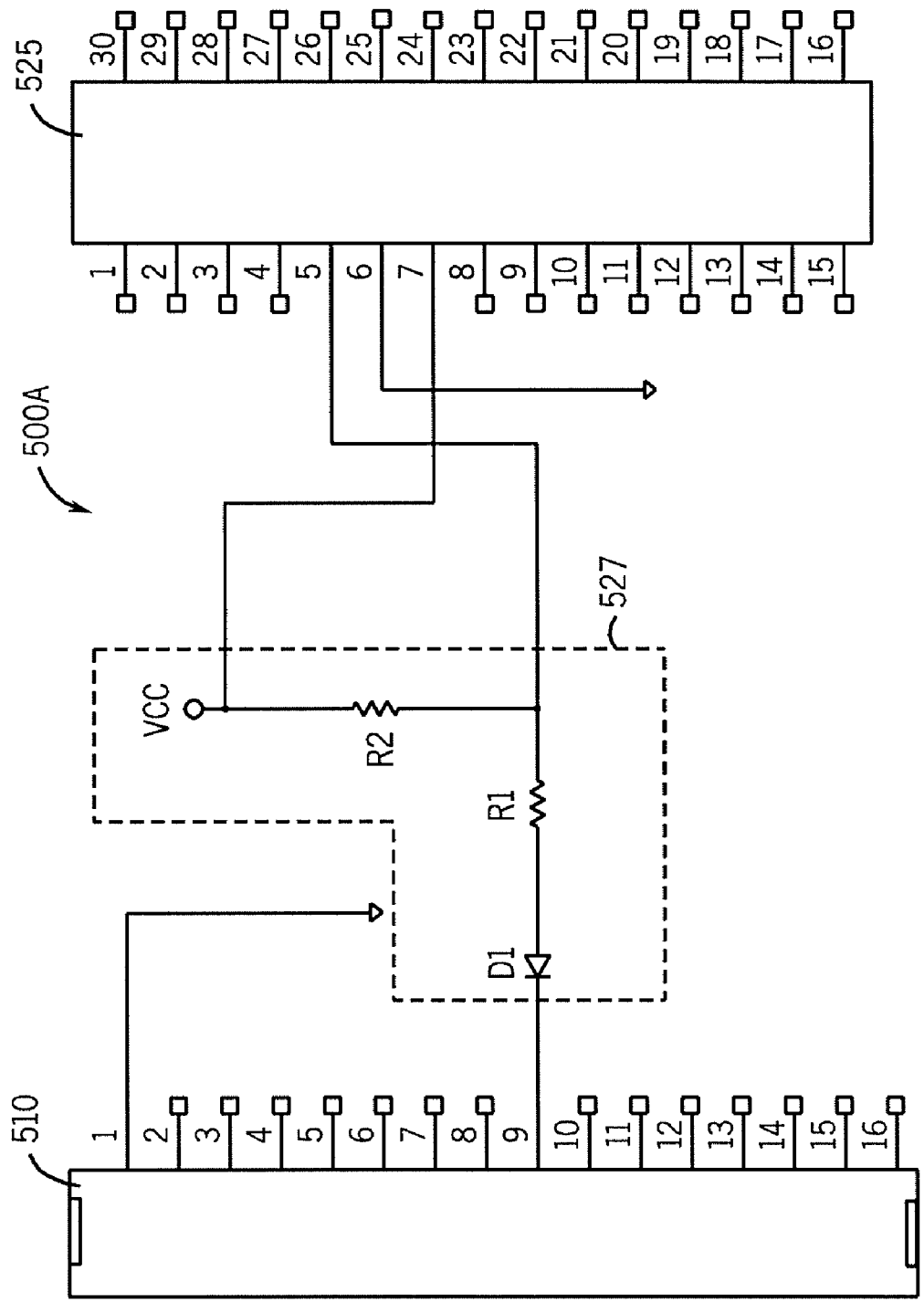
FIG. 11A is a circuit diagram of a sensor circuit.

FIG. 11A illustrates a circuit 500A including a connector 510 and a programmable device 525 similar to the connector 110, 310, 410 and programmable device 125, 325, 425. A sensor circuit 527 connects the connector 510 to the programmable device 525 and is operable to assist in detecting a negative voltage at pin 9 of the connector 510 (from hereon "pin 9"). More specifically, pin 9 has a negative voltage signal to be detected at pin 5 of the programmable device 525 (from hereon "pin 5"). The sensor circuit 527 includes two resistors R1, R2 and a diode D1. Detecting the negative voltage signal includes pulling pin 5 to a relatively high voltage with resistor R2. Pin 5 reads high when there is no voltage or a positive voltage on pin 9. When pin 9 has a negative voltage present (e.g., 24VAC in the negative half-cycle), current flows through resistors R2, R1, diode D1 and out pin 9. The resistor values are generally set such that pin 5 is near zero volts when a negative voltage is detected, and thus, signal the processor that pin 9 is negative.

One problem of the sensor circuit 527 is that a negative voltage on pin 5 can cause latch-up, thus resulting in pin 5 (or other pins of the programmable device 525) malfunctioning or causing damage to the programmable device 525. The sensor circuit 527 does not include a mechanism or means to prevent pin 5 from going to a negative voltage and causing damage to the programmable device 525. Moreover, if the voltage at pin 9 is AC from a transformer, the exact voltage varies. Therefore, it is generally not possible to set the resistor values to preclude a negative voltage on pin 5.

Figure 11B:
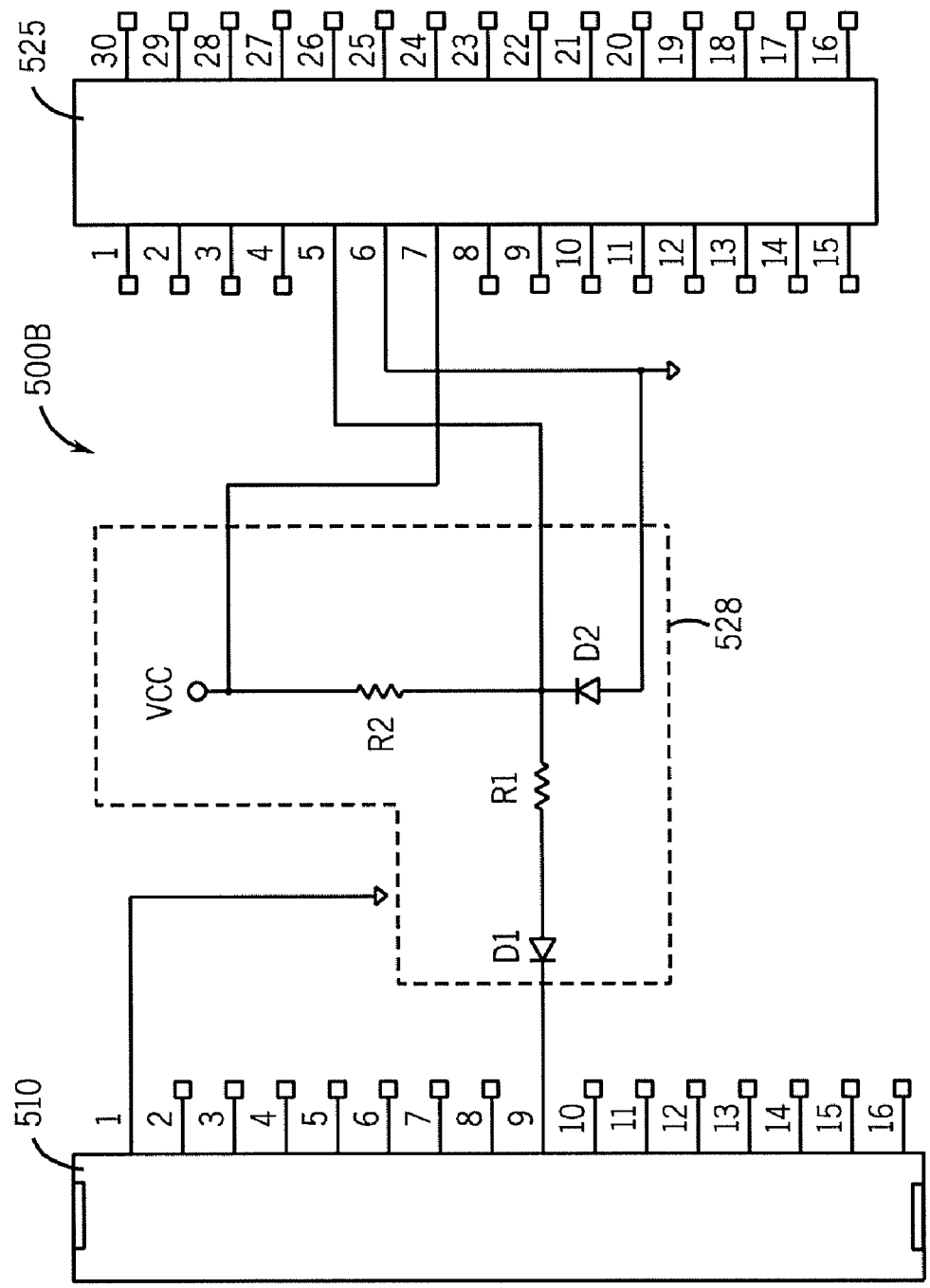
FIG. 11B is a circuit diagram of a sensor and protector circuit.

FIG. 11B illustrates a circuit 500B including the connector 510, the programmable device 525, and a sensor and protector circuit 528 electrically coupling the connector 510 to the programmable device 525. The sensor and protector circuit 528 includes two resistors R1, R2 and a diode D1 similar to the sensor circuit 527. However, the sensor and protector circuit 528 also includes another diode D2 as a possible solution to the problem stated above. The diode D2 is operable to prevent pin 5 from being driven to an excessive negative voltage by allowing current to flow from ground through diode D2, resistor R1, diode D1 and out pin 9. However, a standard signal diode generally permits some voltage drop during operation (about 0.5 volts to about 0.7 volts). The voltage drop of diode D2 allows pin 5 to have a negative voltage of similar value. It is also noted that most manufacturers of programmable devices (e.g., programmable device 525) do not recommend letting the I/O pins go below −0.2 volts.

As a result, diode D2 can include a Schottky diode. A Schottky diode is also known as a hot carrier diode and is a semiconductor diode with low forward voltage drop and a very fast switching action. Accordingly, for many applications using the sensor and protector circuit 528, the Schottky diode as diode D2 limits the voltage across diode D2 and therefore also limits the negative voltage on pin 5. However, Schottky diodes are generally expensive, about 10 times the cost of a standard signal diode. Therefore, utilizing Schottky diodes can come with a cost penalty.

Figure 11C:
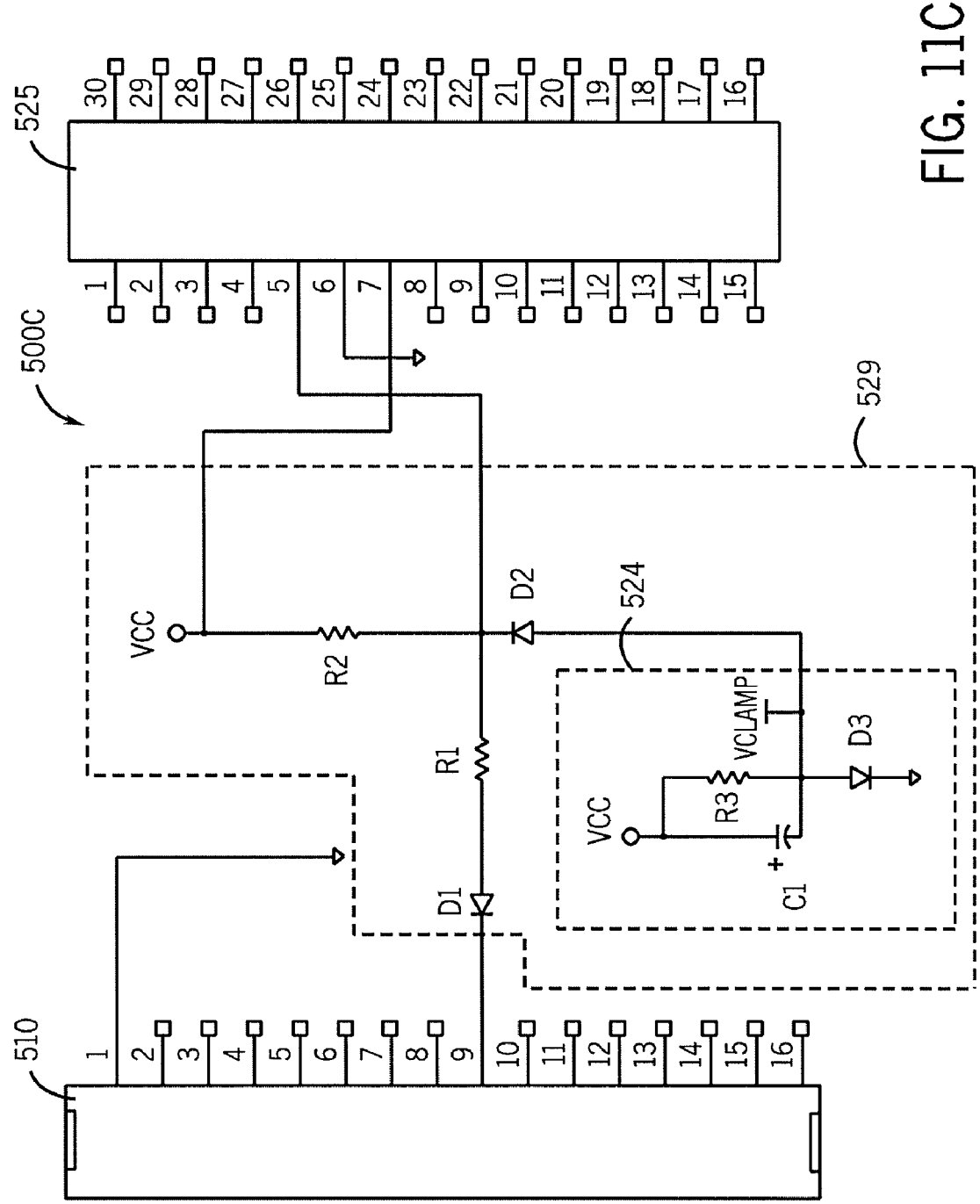
FIG. 11C is a circuit diagram of another sensor and protector circuit.

FIG. 11C illustrates a circuit 500C including the connector 510, the programmable device 525, and a sensor and protector circuit 529 electrically coupling the connector 510 to the programmable device 525. The sensor and protector circuit 529 includes two resistors R1, R2 and two diodes D1, D2 similar to the sensor and protector circuit 528. However, the sensor and protector circuit 529 also includes a voltage-clamp circuit 524 similar to the voltage-clamp circuit 324, 424. The voltage-clamp circuit 524 is operable to generate a clamp voltage and includes a connection to a power source VCC, a capacitor C1, a resistor R3 in parallel configuration with capacitor C5, and a diode D3 coupled to ground.

More specifically, the clamp voltage (labeled VCALMP) generated by the voltage-clamp circuit 524 is a slightly positive voltage connected to diode D2. Connecting diode D2 to the clamp voltage allows diode D2 to generate a voltage drop of about 0.5 volts to about 0.7 volts during operation, while maintaining pin 5 above −0.2 volts. Accordingly, when pin 9 receives a negative voltage, pin 5 is pulled to a low voltage allowing the programmable device 525 to detect the negative voltage. In the case when the voltage on pin 9 drops to a relatively excessive negative voltage, current is allowed to flow from the power source VCC through resistor R3, diode D2, resistor R1, and diode D1 to protect the programmable device 525. Because the input to the connector 510 is generally defined by an AC current, flow of current through the voltage-clamp circuit 524 starts and stops approximately within each cycle of the AC current. The capacitor C1 holds a reserve charge to maintain enough current available to flow through diode D2 when operation requires. One advantage of the circuit 529 over circuit 528 is the reduced cost of components, considering that circuit 529 does not utilize a Schottky diode. It is to be understood that circuits 527, 528, 529 are applicable to all PCBs illustrated by circuits 135, 335, 435. It is also to be understood that other configurations of the circuit 529 are possible and fall within the scope of the invention.

Thus, the invention provides a new and useful interface cord, a new and useful system having an interface cord, and new and useful methods of operating the interface cord and system including the interface cord.

What is claimed is:

1. A method of configuring an electrical machine with an interface cord including
    a first connector,
    a cable having a first end and a second end, the cable coupled to the first connector at the cable first end, and
    a circuit board coupled to the cable at the cable second end, the circuit board including a second connector and a programmable device having a memory, the programmable device electrically coupled in circuit between the cable second end and the second connector, the method comprising:
    coupling one of the first connector and the second connector of the interface cord to a first electrical machine; and
    downloading data from the electrical machine to the memory;
    decoupling the one of the first connector and the second connector with the electrical machine;
    coupling the one of the first connector and the second connector with a second electrical machine; and
    uploading the data to the second electrical machine.

2. The method as claimed in claim 1, wherein the first electrical machine includes a motor assembly and a motor controller with a third connector, wherein the method further includes engaging the third connector with one of the first connector and the second connector of the interface cord.

3. The method as claimed in claim 1, further comprising
    receiving a first signal having a first pin configuration,
    translating the first signal to a second signal having a second pin configuration, and
    communicating the second signal to the electrical machine.

4. The method as claimed in claim 3, wherein receiving the first signal includes receiving the first signal from an external controller.

5. The method as claimed in claim 3, wherein the downloaded data includes characterization data for operating the electrical machine.

6. An electrical machine assembly for an HV AC system including a blower and an external controller, the electrical machine assembly comprising:
    an electrical machine coupled to the blower for moving the blower, the electrical machine including
        a motor assembly having a stator and a rotor, and
        a motor controller connected to the motor assembly and having a first connector;
    a second connector coupled to the external controller;
    a cable connected to the second connector;
    a third connector coupled to the cable and engaging the first connector; and
    a circuit board electrically coupled in circuit with the second connector, the cable, and the third connector, the circuit board including a processor and a memory, the memory including characterization data and being configurable to receive characterization data from the motor controller.

7. The electrical machine assembly as claimed in claim 6, wherein the received characterization data includes data related to a configuration of the HV AC system.

8. The electrical machine assembly as claimed in claim 6, wherein the circuit board is in circuit between the first and second connectors.

9. The electrical machine assembly as claimed in claim 6, wherein the cable includes a first end directly coupled to the circuit board.

\* \* \* \* \*